US010518372B2

(12) United States Patent
Bergeron et al.

(10) Patent No.: US 10,518,372 B2
(45) Date of Patent: Dec. 31, 2019

(54) COMPOUND PRISMATIC PLATFORMS FOR USE IN ROBOTIC SYSTEMS

(71) Applicant: Kindred Systems Inc., Vancouver (CA)

(72) Inventors: Nicolas Normand Bergeron, San Mateo, CA (US); Thomas John Hummel, San Mateo, CA (US); David Gabriel Hallock, Redwood City, CA (US)

(73) Assignee: Kindred Systems Inc., San Francisco, CA (US)

( * ) Notice: Subject to any disclaimer, the term of this patent is extended or adjusted under 35 U.S.C. 154(b) by 205 days.

(21) Appl. No.: 15/701,232

(22) Filed: Sep. 11, 2017

(65) Prior Publication Data

US 2018/0071874 A1    Mar. 15, 2018

Related U.S. Application Data

(60) Provisional application No. 62/393,474, filed on Sep. 12, 2016, provisional application No. 62/393,476, filed on Sep. 12, 2016.

(51) Int. Cl.
*B23Q 1/54* (2006.01)
*H02K 7/116* (2006.01)
(Continued)

(52) U.S. Cl.
CPC .............. *B23Q 1/54* (2013.01); *B25J 5/007* (2013.01); *B25J 9/0006* (2013.01); *B25J 9/0048* (2013.01);
(Continued)

(58) Field of Classification Search
CPC combination set(s) only.
See application file for complete search history.

(56) References Cited

U.S. PATENT DOCUMENTS 1,694,031 A    12/1928  Braren
3,246,876 A     4/1966  Larson
(Continued)

FOREIGN PATENT DOCUMENTS

CA    2 451 824 A1    1/2003

OTHER PUBLICATIONS

Byl, "Optimal Kinodynamic Planning for Compliant Mobile Manipulators," *Proceedings of the International Conference on Robotics and Automation (ICRA)*: 2010, 7 pages.
(Continued)

*Primary Examiner* — Emily P Pham
(74) *Attorney, Agent, or Firm* — Seed Intellectual Property Law Group LLP

(57) ABSTRACT

An apparatus for use with a robot may couple to or form part of an appendage, for example a wrist. The apparatus can include a base, a first platform, a second platform, a first set of linear actuators that moveably couple the first platform to the base and a second set of linear actuators that moveably couple the second platform to the first platform. The apparatus can take the form of dual prismatic platforms. A controller can provide control signals to operate the linear actuators to cause the first platform to translate and rotate with respect to the base and to cause the second platform to translate and rotate with respect to the first platform. Connectors can couple the base to an appendage and couple an end effector to the second platform.

42 Claims, 18 Drawing Sheets

(51) Int. Cl.

| | |
|---|---|
| *G05D 16/00* | (2006.01) |
| *B25J 5/00* | (2006.01) |
| *B25J 9/00* | (2006.01) |
| *B25J 9/04* | (2006.01) |
| *B25J 9/10* | (2006.01) |
| *B25J 9/14* | (2006.01) |
| *B25J 13/00* | (2006.01) |
| *B25J 13/02* | (2006.01) |
| *B25J 13/04* | (2006.01) |
| *B25J 15/00* | (2006.01) |
| *B25J 15/10* | (2006.01) |
| *B25J 19/00* | (2006.01) |
| *B25J 19/02* | (2006.01) |

(52) U.S. Cl.
CPC ............... *B25J 9/0087* (2013.01); *B25J 9/04* (2013.01); *B25J 9/046* (2013.01); *B25J 9/102* (2013.01); *B25J 9/144* (2013.01); *B25J 13/003* (2013.01); *B25J 13/006* (2013.01); *B25J 13/025* (2013.01); *B25J 13/04* (2013.01); *B25J 15/0009* (2013.01); *B25J 15/103* (2013.01); *B25J 19/005* (2013.01); *B25J 19/023* (2013.01); *G05D 16/00* (2013.01); *H02K 7/116* (2013.01)

(56) References Cited

U.S. PATENT DOCUMENTS

| | | | |
|---|---|---|---|
| 4,954,042 A | | 9/1990 | Becicka et al. |
| 5,052,736 A | | 10/1991 | Loncaric et al. |
| 5,410,944 A | | 5/1995 | Cushman |
| 5,451,134 A | | 9/1995 | Bryfogle |
| 5,653,680 A | * | 8/1997 | Cruz ................... A61F 5/013 482/45 |
| 2001/0029343 A1 | * | 10/2001 | Seto ................... A61F 2/54 600/587 |
| 2003/0155747 A1 | | 8/2003 | Bridges |
| 2011/0282253 A1 | * | 11/2011 | Menon ................. A61F 5/013 601/40 |
| 2011/0283825 A1 | * | 11/2011 | Corcoran .............. F16H 25/20 74/396 |
| 2012/0168593 A1 | * | 7/2012 | Mekid ................. F16M 11/043 248/398 |
| 2016/0243701 A1 | | 8/2016 | Gildert et al. |
| 2017/0066128 A1 | | 3/2017 | Gildert |

OTHER PUBLICATIONS

Carricato et al., "A Family of 3-DOF Translational Parallel Manipulators," *ASME Journal of Mechanical Design* 125(2):302-307, 2003 (12 pages).

du Plessis,"An Optimization Approach to the Determination of Manipulator Workplaces," master's thesis, University of Pretoria, South Africa, 1999, Chapter 1, pp. 1-40 (41 pages).

Fan et al., "Dusty: A Teleoperated Assistive Mobile Manipulator that Retrieves Objects from the Floor," *Disabil Rehabil Assist Technol.* 7(2):168-179, 2012.

Glozman et al., "Novel 6-DOF parallel manipulator with large workspace," *Robotica* 27(6):891-895, 2009.

Kristoffersson et al., "A Review of Mobile Robotic Telepresence," *Advances in Human-Computer Interaction* 2013: 2013, 18 pages.

Lunenburg et al., "Tech United Eindhoven @Home 2016 Team Description Paper," Eindhoven University of Technology, Eindhoven, Netherlands, 2016, 8 pages.

Onvio LLC, "Zero Backlash Speed Reducers," Product Data Sheet, 2005, 20 pages.

Sima'an et al., "Design Considerations of New Six Degrees-of-Freedom Parallel Robots," *Proceedings of the 1998 IEEE International Conference on Robotics & Automation,* Leuven, Belgium, pp. 1327-1333, 1998.

Stilman et al., "Golem Krang: Dynamically Stable Humanoid Robot for Mobile Manipulation," *IEEE International Conference on Robotics and Automation ICRA '10*:2010, 6 pages.

Vischer et al., "Argos: A Novel 3-DoF Parallel Wrist Mechanism," *International Journal of Robotics Research* 19(1):5-11, 2000.

\* cited by examiner

COMPOUND PRISMATIC PLATFORMS FOR USE IN ROBOTIC SYSTEMS

TECHNICAL FIELD

The present disclosure generally relates to robotics, and, more particularly, to robot appendages and/or end-effectors.

BACKGROUND

Description of the Related Art

Robots are systems, machines, or devices that are capable of carrying out one or more tasks. A robot is an electro-mechanical machine controlled by circuitry for example a processor executing processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled or control switches between autonomous and operator controlled modes. As well, a robot includes computational resources to preform computational tasks. The computational tasks can be in aid of the physical tasks.

BRIEF SUMMARY

An apparatus for robots, can be summarized as including a base and a first set of linear actuators where each of the linear actuators of the first set of linear actuators has a respective longitudinal axis, and each of the linear actuators of the first set of linear actuators has a respect portion that is selectively operable to translate along the respective longitudinal axis of the respective linear actuator. The apparatus for robots may further include a first set of revolute joints where each of the revolute joints of the first set of revolute joints physically couples a respective one of the linear actuators of the first set of linear actuators to the base. The apparatus for robots may further include a first platform, a first set of spherical joints, a second set of linear actuators, and a second set of revolute joints. Each of the spherical joints of the first set of spherical joints physically may couple a respective one of the linear actuators of the first set of linear actuators to the first platform. Each of the linear actuators of the second set of linear actuators may have a respective longitudinal axis. Each of the linear actuators of the second set of linear actuators may have a respect portion that is selectively operable to translate along the respective longitudinal axis of the respective linear actuator. Each of the revolute joints of the second set of revolute joints may physically couple a respective one of the linear actuators of the second set of linear actuators to the first platform.

An apparatus may be summarized as including a first link that includes a proximal side and a distal side. The proximal side of the first link may be coupled to a portion of a robot. The apparatus may further include a proximal prismatic platform that includes a first plurality of linear actuators extending distally from the first link, a first plurality of revolute joints that couples the first plurality of linear actuators to the first link, a second link, and a first plurality of spherical joints. Each linear actuator in the first plurality of linear actuators may include a distal end and a proximal end. Each revolute joint in the first plurality of revolute joints may couple a proximal end of each linear actuator to the first link. Each spherical joint in the first plurality of spherical joints may couple a distal end of each linear actuator to the second link. The apparatus may further include a distal prismatic platform that includes a second plurality of linear actuators that extend distally from the second link, a second plurality of revolute joints, a third link including a distal side, and a second plurality of spherical joints. Each linear actuator in the second plurality of linear actuators may include a distal end and a proximal end. Each revolute joint in the second plurality of revolute joints may couple the first link to a proximal end of each linear actuator in the second plurality of linear actuators. Each the distal side of the third link may be coupled to the distal side of an end-effector. Each spherical joint in the second plurality of spherical joints may couple the third link to a distal end of each linear actuator in the second plurality of linear actuators.

An apparatus for robots may be summarized as including a base, a first prismatic platform coupled to the base and extends along a first respective longitudinal axis, and a second prismatic platform coupled to the first prismatic platform and extends along a second respective longitudinal axis.

An apparatus, for use in a robotic system, may be summarized as including a linkage that includes at least three links, and an equal number of joints to links. The at least three links and equal number of joints may be coupled together in an open chain with planar degrees of freedom. The apparatus may further include a plurality of motors, and a plurality of gearboxes. Each gearbox in the plurality of gearboxes may be self-locking and each gearbox in the plurality of gearboxes may include an input shaft and an output shaft. A respective motor in the plurality of motors may drive a respective input shaft of a respective gearbox of the plurality of gearboxes, and each output shaft of the representative gearbox may be coupled to, and may drive, a respective joint in the linkage.

A robotic system may be summarized as including an apparatus comprising compound prismatic platforms substantially as described and illustrated herein.

A robotic apparatus substantially as described and illustrated herein.

A method of operation of a robotic system and/or robotic apparatus substantially as described and illustrated herein.

A robotic system including an open planar linkage substantially as described and illustrated herein.

A robotic apparatus substantially as described and illustrated herein.

A method of operation of a robotic system and/or robotic apparatus substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings. Systems, devices, articles, and methods are described in greater detail herein with reference to the following figures.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with machine learning and/or robotics, such as processors, sensors, storage devices, network interfaces, articles or workpieces, robot body, and end-effector, have not been shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is, as "including, but not limited to".

Reference throughout this specification to "one", "an", or "another" applied to "embodiment", "example", or "implementation" means that a particular referent feature, structure, or characteristic described in connection with the embodiment, example, or implementation is included in at least one embodiment, example, or implementation. Thus, the appearances of the phrases "in one embodiment", or "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the singular forms "a", "an", and "the" include plural referents unless the content clearly dictates otherwise. Thus, for example, reference to a distributed system including "a processor-based device" includes a single a processor-based device, or two or more a processor-based devices. It should also be noted that the term "or" is generally employed in its sense including "and/or" unless the content clearly dictates otherwise.

The headings provided herein are for convenience only and do not interpret the scope or meaning of the embodiments.

Figure 1:
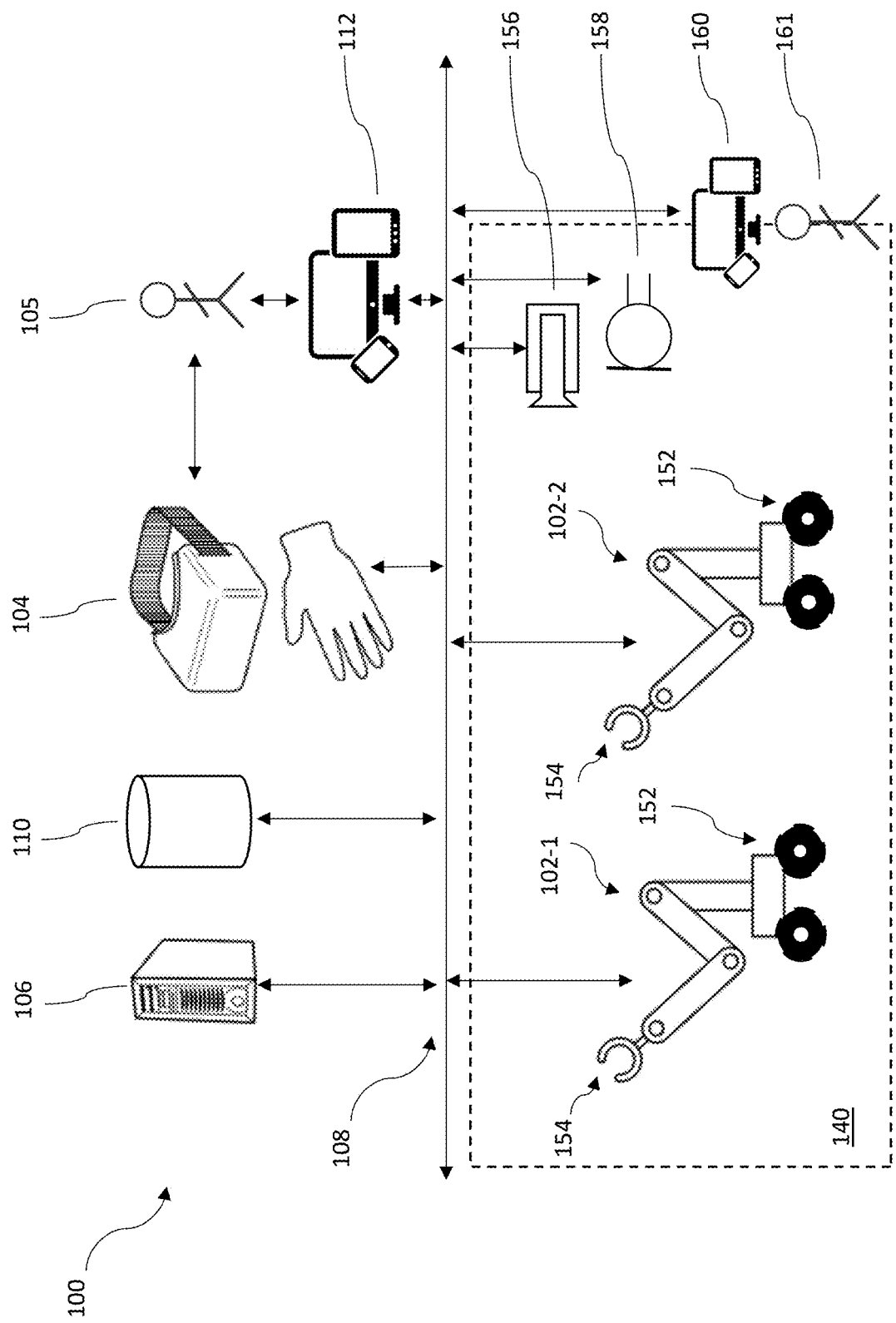
FIG. 1 is a schematic diagram illustrating a portion of a robotic system, and an optional human operator, that may be used to implement the present systems, devices, articles, and methods.

FIG. 1 shows an exemplary robotic system 100 in accordance with the present system, devices, articles, and method, and an optional human operator 105. Various components of system 100 are optional. As shown, the system 100 includes a plurality of hosts 102-1, 102-2, 106-1, 106-2 with two or more of the hosts communicatively coupled to each other. A host in the plurality of hosts includes at least one hardware processor, that may execute processor-readable and processor-executable instructions. The plurality of hosts include a plurality of robots 102-1, 102-2, (two shown, singularly or collectively 102). The robots 102 may be associated with one or more optional operator interfaces, such as, operator interface 104. The plurality of hosts include a plurality of computer systems, e.g., computer systems 106-1, 106-2 (two shown, collectively 106). While illustrated as two robots 102-1, 102-2, and two computer systems 106-1, 106-2 various implementations can include a greater or fewer number of robots 102 and/or computer systems 106.

The plurality of hosts may all be communicatively coupled via one or more network or non-network communication channel(s) 108. The system 100 can include one or more nontransitory tangible computer- and processor-readable storage devices 110 which store processor-executable instructions and/or processor-readable data. A nontransitory storage device includes one or more storage media upon or within which processor-executable instructions and/or processor-readable data may be stored. While illustrated separately from the computer systems 106, in at least some implementations the one or more nontransitory tangible computer- and processor-readable storage devices 110 can be an integral part or component of the computer systems 106 (e.g., memory such as RAM, ROM, FLASH, registers; hard disk drives, solid state drives).

Operator interface 104 includes one or more input devices to capture motion or actions of a human operator 105. Operator interface 104, an example of a user interface, can include one or more user input devices, including those described herein, and one or more user output devices, for instance a display (e.g., LCD or OLED screen), head mounted display, speaker, and/or haptic feedback generator (e.g., vibration element, piezo-electric actuator, rumble motor). Human operator via operator interface 104 can perform a series of actions to guide a robot, e.g., robot 102-2, to accomplish at least one task.

Examples of computer systems 106 are described herein. Computer systems 106 may facilitate or coordinate the operation of system 100. A computer system in computer systems 106 could be a processor-based computer system. The processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. Computer systems 106 may include a control subsystem including at least one processor. The at least one processor or the control subsystem or computer system 106 may be referred to as a controller. The computer systems 106 or system may, in some instances, be termed or referred to interchangeably as a computer, server or an analyzer. The computer systems 106 or system may, in some instances, be termed or referred to interchangeably as a computer, server or an analyzer.

Examples of a suitable network or communication channel, such as communication channel(s) 108, include a wire based network or non-network communication channels, optical based network or non-network communication channel, wireless (e.g., radio and/or microwave frequency) network or non-network communication channel, or a combination of wired, optical, and/or wireless networks or non-network communication channels. Suitable communication protocols include FTP, HTTP, Web Services, SOAP with XML, and the like.

System 100 can include one or more robots 102, and the like. Human operator 105 may via an interface, such as operator interface 104, pilot or direct at least one of the one or more of robots 102, in piloted mode. Robots 102 may operate in autonomous mode. Robots 102 operate in, and receive data about, an environment 140 that comprises a physical space.

A robot, like one of robots 102, is an electro-mechanical machine controlled by circuitry and/or one or more processors executing processor-executable instructions. One or more robots 102 can be controlled autonomously, for example via an on-board or a remote processor executing processor executable instructions, typically based on some sensed input data (e.g., processed machine-vision information, information that represents a level of force or weight sensed by a transducer, information representative of a distance traveled, for instance optical encoder information information). One or more human operators can control one or more robots 102. Another machine, including another robot, or the like, can control the one or more robots 102. In some instances, a robot 102 may be controlled autonomously at one time, while being piloted, operated, or controlled by a human operator at another time. That is, operate under an autonomous control mode and change to operate under a piloted mode (i.e., non-autonomous).

A robot performs one or more physical tasks, for example, performing work with tangible results and/or performs computational tasks. A robot has the ability to move at least a portion of the robot in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be included as a component in a larger system, for instance system 100.

A robot 102 typically includes wheels and drive train 152 (an example of a propulsion or motion subsystem) comprising of one or more motors, solenoids or other actuators, and associated hardware (e.g., drivetrain, wheel(s), treads), to propel the robot in a physical space. The space does not need to be horizontal or terrestrial. Examples of spaces include water, air, vertical spaces, outer space (i.e., outside the Earth's atmosphere), and the like.

A robot includes a manipulation subsystem comprising one or more appendages, such as, one or more arms, and/or one or more associated end-effectors (also referred to as end of arm tools), such as, arm and end-effector 154. An end-effector or end of arm tool is a device attached to a robotic arm or appendage designed or structured to interact with the environment. End-effectors for robot operating in unstructured environments are devices of complex design. Ideally, these are capable of performing many tasks, including for example grasp or grip or otherwise physically releasably engage or interact with an item, e.g., article, object, or workpiece. Examples of robots 102 and parts thereof are shown and described in relation to, at least, FIGS. 4, 7, 8, 13, and 14.

Robots 102 operate in, and receive data about, an environment 140 that comprises a physical space. Herein about is employed in the sense meaning represents, characterizes, or summarizes. Robots 102 receive data from one or more sensors such as environmental sensors or internal sensors. Environmental sensors provide data that represents one or more aspect of the environmental conditions for the robots 102. Examples of environmental sensors includes camera 156 and microphone 158. The internal sensor data represents information about the internal state of a robot. For example, the internal sensor data represents a level of an internal power supply (e.g., battery, energy source, fuel cell, fuel, or the like).

A human operator 105, not part of the robotic system 100, may pilot at least one of the one or more of robots 102, for example via operator interface 104. Alternatively, a robot may act autonomously (i.e., under its own control). In a human operator controlled (or piloted) mode, the human operator 105 observes representations of sensor data, for example, video, audio or haptic data received from one or more environmental sensors or internal sensor. The human operator then acts, conditioned by a perception of the representation of the data, and creates information or executable instructions to direct the at least one of the one or more of robots 102.

A robot, like one of robots 102, may be communicatively coupled to communication channel(s) 108. Robots 102 may send and/or receive processor readable data or processor executable instructions via communication channel(s) 108. Robots 102 interact with one or more user interfaces. Operator interface 104 receives and/or sends processor-readable data and/or processor-executable instructions across communication channel(s) 108. Operator interface 104 creates or provides human readable representations of processor readable instructions.

The system 100 can include one or more user interface devices 160. The one or more user interface devices 160 includes one or more input and output devices such as keyboards, mice, touch displays, displays (e.g., LCD or OLED screen), and the like. The one or more user interface devices 160 may be devices in different form factors, such as, personal computer, tablet, (smart) phone, wearable computer, and the like. A person, such as a human operator or observer, could operate or utilize user interface device(s)

160 to input information that represents success or failure of a robot at the one or more tasks, and the like.

One or more human observers 161 may observe aspects of environment 140, robots 102, and the like. Observer(s) 161 may view or see a representation of the robot performing one or more tasks. For example, observer(s) 161 may review one or more still images and one or more moving images of the robots 102 in environment 140. Observer(s) 161 may be present in or proximate to environment 140 to directly experience, e.g., view, robots 102 performing one or more tasks. Observer(s) 161 may interact with user interface device(s) 160 to provide information about the robots and the one or more tasks.

While system 100 is illustrated with two robots 102, one operator interface 104, one processor-based computer system 106, and one user interface device(s) 160, any of the various implementations can include a greater or lesser number of robots 102, operator interface(s) 104, processor-based computer systems 106, and user interface device(s) 160. Human operator 105 at operator interface 104 may interact with parts of system 100 to navigate a virtual environment (not shown).

Figure 2:
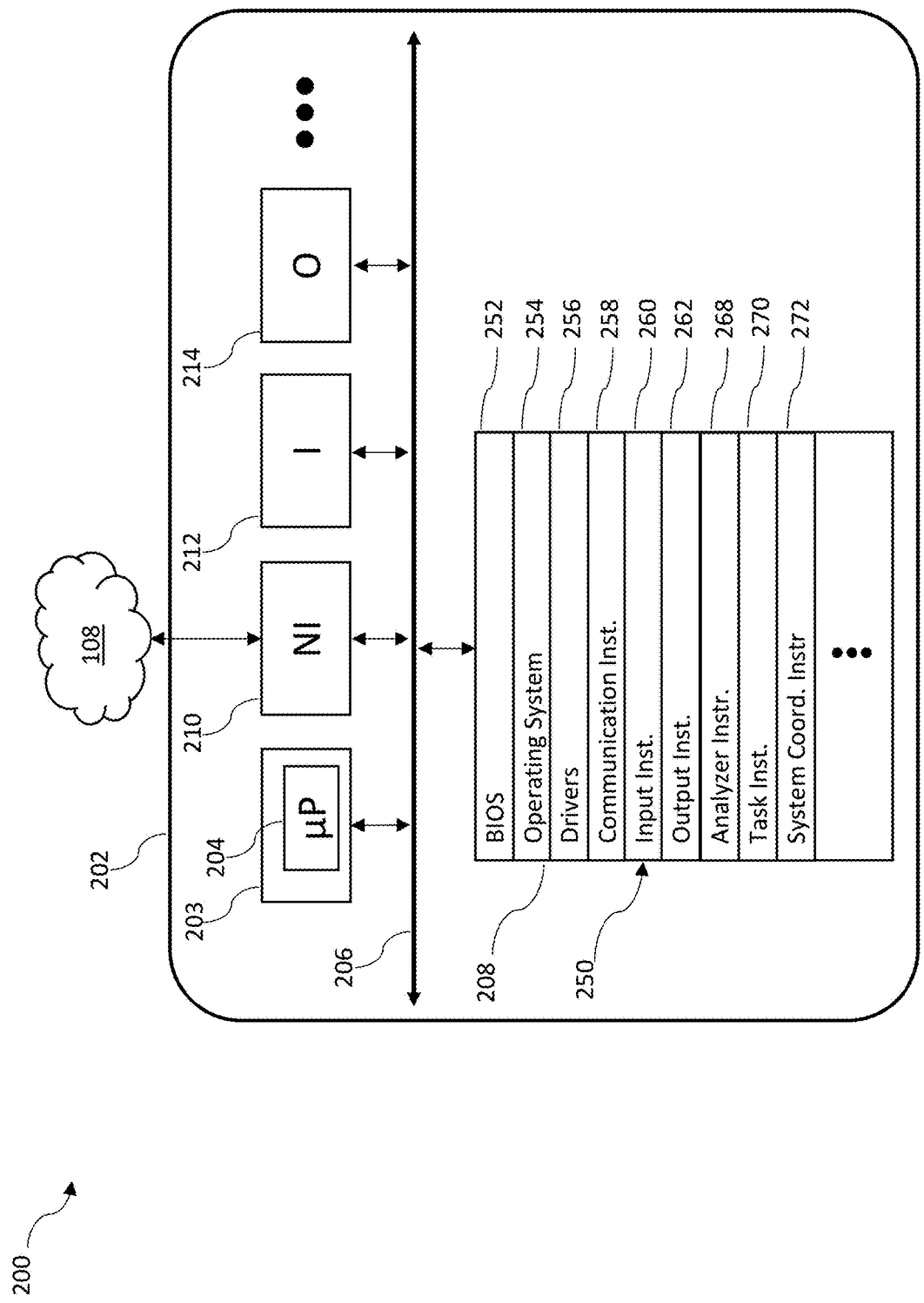
FIG. 2 is a schematic view illustrating an exemplary computer system suitable for inclusion in the system shown in FIG. 1.

FIG. 2 schematically shows parts of a computer system, including a processor, for use as a host in the system 100, shown in FIG. 1 in accordance with the present system, devices, articles, and methods. Computer system or system 200 shares some similar components with a robot, such as, robot 102, but differs in lacking the propulsion or motion sub-system and the manipulation sub-system.

The system 200 includes at least one body or housing 202, and a control subsystem 203 that includes at least one processor 204, at least one nontransitory computer- or processor-readable storage device 208, and at least one bus 206 to which, or by which, the at least one processor 204, and storage device(s) 208 are communicatively coupled.

At least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. Processor(s) 204 may be referred to in the singular, but may be two or more processors.

The system 200 includes a network interface subsystem 210 communicatively coupled to bus(es) 206 and provides bi-directional communication to other systems (e.g., a system external to computer system 200) via one or more network or non-network communication channel(s) (e.g., communication channel(s) 108). Network interface subsystem 210 includes circuitry. Network interface subsystem 210 may use a communication protocols (e.g., FTP, HTTP, Web Services, and SOAP with XML) to effect bidirectional communication of information including processor-readable data, and processor-executable instructions.

The system 200 includes an input subsystem 212. In some implementations, input subsystem 212 includes one or more user interface input devices, such as, a display a keyboard, a mouse, a microphone, and a camera. In some implementations, input subsystem 212 includes one or more sensors such as environmental sensors. In some implementations, input subsystem 212 is coupled to the control subsystem 203 via the network interface subsystem 210. The system 200 includes an output subsystem 214 comprising one or more output devices, such as, displays, speakers, and lights. Bus(es) 206 may communicatively couple input subsystem 212, output subsystem 214, and processor(s) 204.

The at least one nontransitory computer- or processor-readable storage device 208 includes at least one nontransitory storage medium. In some implementations, storage device 208 includes two or more distinct devices. Storage device(s) 208 can, for example, include one or more volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), a hard disk drive (HDD), a network drive, flash memory, digital versatile disk (DVD), any other forms of computer-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like. The at least one storage device 208 may store on or within the included storage media processor-readable data, and/or processor-executable instructions.

Storage device(s) 208 include or stores processor-executable instructions and/or processor-readable data 250 associated with the operation of computer system 200, system 100, robot(s) 102, computer system(s) 106, and the like. In some implementations, the processor-executable instructions and/or processor-readable data 250 includes include a basic input/output system (BIOS) 252, an operating system 254, drivers 256, communication instructions and data 258, input instructions and data 260, output instructions and data 262, analyzer instructions and data 268, task instructions and data 270, and system coordination instructions and data 272.

Exemplary operating systems 254 include ANDROID™, LINUX®, and WINDOWS®. The drivers 256 include processor-executable instructions and data that allow control subsystem 203 to control circuitry of computer system 200. The processor-executable communication instructions and data 258 include processor-executable instructions and data to implement communications between computer system 200 and another processor-based device via network interface subsystem 210. The processor-executable input instructions or data 260, when executed, guide computer system 200 to process input from input subsystem 212, from sensors included in a wider system such as system 100, information that represents input stored on or in a storage device. The processor-executable output instructions or data 262, when executed, guide or direct computer system 200 to provide and/or transform information for display. The processor-executable analyzer instructions and data 268 when executed, guide or direct computer system 200 to process data collected from robot sensors and motor data. The processor-executable task instructions and data 270, when executed, guide or direct computer system 200 in an instant application or task for computer system 200, computer system 106, system 100, robot 102, or the like.

The processor-executable system coordination instructions and data 272 guide the computer system 200 to start, run, and stop one or more hosts or components of a system. The instructions and data 272, when executed, guide the system to establish and maintain communication between hosts. The processor-executable analyzer instructions and data 268, processor-executable task instructions and data 270, and/or processor-executable system coordination instructions and data 272 may implement, in part, the methods described herein, including those in and in relation to FIGS. 12, 18, and the like.

Figure 3:
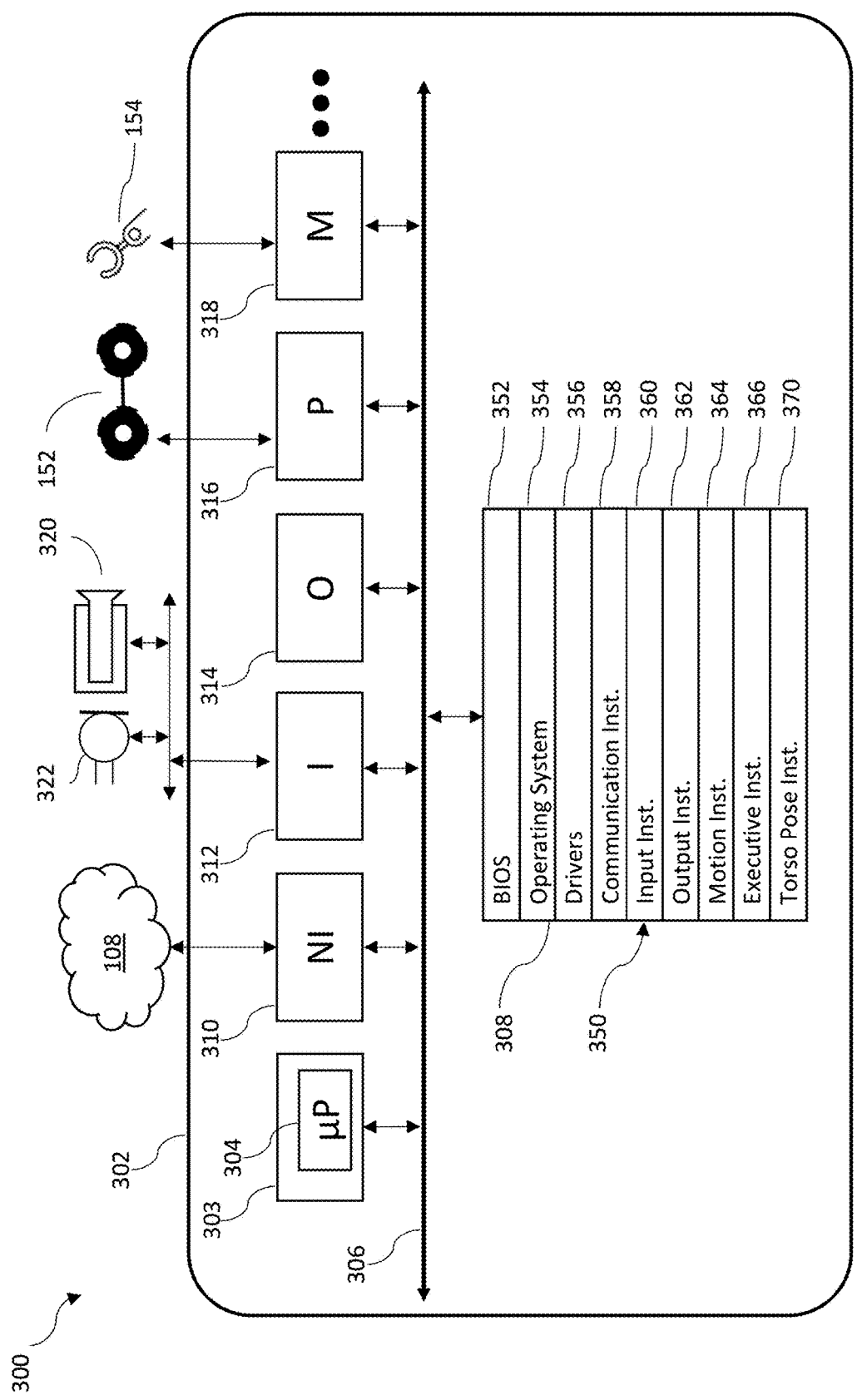
FIG. 3 is a schematic view illustrating an exemplary robot suitable for inclusion in the system shown in FIG. 1.

FIG. 3 illustrates an exemplary robot 300. As discussed herein, robots may take any of a wide variety of forms. FIG. 3 schematically shows parts of robot 300. Robot 300 includes at least one body 302, a control subsystem 303 that includes at least one processor 304, at least one nontransitory tangible computer- and processor-readable storage device 308, and at least one bus 306 to which the at least one processor 304 and the at least one nontransitory tangible computer- or processor-readable storage device 308 are communicatively coupled.

The at least one processor 304 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. At least one processor 304 may be referred to herein by the singular, but may be two or more processors.

Robot 300 may include a network interface (NI) or communications subsystem 310 communicatively coupled to the bus(es) 306 and provides bi-directional communication with other systems (e.g., external systems external to the robot 300) via a network or non-network communication channel, such as, communication channel(s) 108. An example network is a wireless network. The communications subsystem 310 may include one or more buffers. The communications subsystem 310 receives and sends data for the robot 300.

The communications subsystem 310 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI compliant, BLUETOOTH compliant, cellular (e.g., GSM, CDMA), and the like. Suitable transportation protocols include TCP/IP, SCTP, and DCCP.

Robot 300 includes an input subsystem 312. In any of the implementations, the input subsystem 312 can include one or more sensors that measure conditions or states of robot 300, and/or conditions in the environment in which the robot 300 operates. Such sensors include cameras or other imagers 320 (e.g., responsive in visible and/or nonvisible ranges of the electromagnetic spectrum including for instance infrared and ultraviolet), radars, sonars, touch sensors, pressure sensors, load cells, microphones 322, meteorological sensors, chemical sensors, or the like. Such sensors include internal sensors, pressure sensors, load cells, strain gauges, vibration sensors, microphones, ammeter, voltmeter, or the like. In some implementations, the input subsystem 312 includes receivers to receive position and/or orientation information. For example, a global position system (GPS) receiver to receive GPS data, two more time signals for the control subsystem 303 to create a position measurement based on data in the signals, such as, time of flight, signal strength, or other data to effect a position measurement. Also for example, one or more accelerometers can provide inertial or directional data in one, two, or three axes.

Robot 300 includes an output subsystem 314 comprising output devices, such as, speakers, lights, and displays. The input subsystem 312 and output subsystem 314, are communicatively coupled to the processor(s) 304 via the bus(es) 306.

Robot 300 includes a propulsion or motion subsystem 316 comprising motors, actuators, drivetrain, wheels, tracks, treads, and the like to propel or move the robot 300 within a physical space and interact with it. The propulsion or motion subsystem 316 comprises of one or more motors, solenoids or other actuators, and associated hardware (e.g., drivetrain, wheel(s), treads), to propel robot 300 in a physical space. For example, the propulsion or motion subsystem 316 includes wheels, and drive train 152. Propulsion or motion subsystem 316 may move body 302 in an environment.

Robot 300 includes a manipulation subsystem 318, for example comprising one or more arms, end-effectors, associated motors, solenoids, other actuators, gears, linkages, drive-belts, and the like coupled and operable to cause the arm(s) and/or end-effector(s) to move within a range of motions. For example, the manipulation subsystem 318 includes an end-effector described in relation to manipulation subsystem, such as, arm and end-effector 154. The manipulation subsystem 318 is communicatively coupled to the processor(s) 304 via the bus(es) 306, which communications can be bi-directional or uni-directional.

Components in robot 300 may be varied, combined, split, omitted, or the like. For example, robot 300 could include a pair of cameras (e.g., stereo pair) or a plurality of microphones. Robot 300 may include one, two, or three end-effectors or end of arm tools in manipulation subsystem 318. In some implementations, the bus(es) 306 include a plurality of different types of buses (e.g., data buses, instruction buses, power buses) included in at least one body 302. For example, robot 300 may include a modular computing architecture where computational resources devices are distributed over the components of robot 300. That is in some implementations, a robot (e.g., robot 300), could have a processor in a left arm and a storage device in its thorax. In some implementations, computational resources are located in the interstitial spaces between structural or mechanical components of the robot 300. A data storage device could be in a leg and a separate data storage device in another limb or appendage. In some implementations, the computational resources distributed over robot 300 include redundant computational resources.

The at least one storage device 308 is at least one nontransitory or tangible storage device. The at least one storage device 308 can include two or more distinct nontransitory storage devices. The storage device(s) 308 can, for example, include one or more volatile storage devices, for instance random access memory (RAM), and/or one or more non-volatile storage devices, for instance read only memory (ROM), Flash memory, magnetic hard disk (HDD), optical disk, solid state disk (SSD), and the like. A person of skill in the art will appreciate storage may be implemented in a variety of nontransitory structures, for instance a read only memory (ROM), random access memory (RAM), a hard disk drive (HDD), a network drive, flash memory, digital versatile disk (DVD), any other forms of computer- and processor-readable memory or storage medium, and/or a combination thereof. Storage can be read only or read-write as needed. Further, systems like system 100 can conflate volatile storage and non-volatile storage, for example, caching, using solid-state devices as hard drives, in-memory data processing, and the like.

The at least one storage device 308 includes or stores processor-executable instructions and/or processor-readable data 350 associated with the operation of robot 300, system 100, and the like.

The execution of processor-executable instructions and/or processor-readable data 350 cause the at least one processor 304 to carry out various methods and actions, for example via the motion subsystem 316 or the manipulation subsystem 318. The processor(s) 304 and/or control subsystem 303 can cause robot 300 to carry out various methods and actions including receive, transform, and present information; move in environment 140; manipulate items; and acquire data from sensors. Processor-executable instructions and/or processor-readable data 350 can, for example, include a basic input/output system (BIOS) 352, an operating system 354, drivers 356, communication instructions and data 358, input instructions and data 360, output instructions and data 362, motion instructions and data 364, executive instructions and data 366, and prismatic platform instructions and data 368.

Exemplary operating systems 354 include ANDROID™, LINUX®, and WINDOWS®. The drivers 356 include processor-executable instructions and data that allow control subsystem 303 to control circuitry of robot 300. The processor-executable communication instructions and data 358 include processor-executable instructions and data to implement communications between robot 300 and an operator interface, terminal, a computer, or the like. The processor-executable input instructions or data 360 guide robot 300 to process input from sensors in input subsystem 312. The processor-executable input instructions and data 360 implement, in part, the methods described herein. The processor-executable output instructions or data 362 guide robot 300 to provide information that represents, or produce control signal that transforms, information for display. The processor-executable motion instructions and data 364, when executed, cause the robot 300 to move in a physical space and/or manipulate one or more items. The processor-executable motion instructions and data 364, when executed, may guide the robot 300 to move within its environment via components in propulsion or motion subsystem 316 and/or manipulation subsystem 318. The processor-executable executive instructions and data 366, when executed, guide the robot 300 the instant application or task for processor-based computer system 106, system 100, or the like. The processor-executable executive instructions and data 366, when executed, guide the robot 300 to reason, problem solve, plan tasks, perform tasks, and the like. The processor-executable prismatic platform instructions and data 368, when executed, guide the robot 300 to operator or control one or more prismatic platforms, including those described herein. Examples of processor-executable prismatic platform instructions are described herein in and in relation to, at least, FIG. 12.

FIGS. 4A and 4B illustrates an exemplary robot 400. FIG. 4A is a front near elevation view. FIG. 4B is a side near elevation view. As discussed herein, robots may take any of a wide variety of forms. These include human operator controllable robots, autonomous robots, and hybrid robotic robot (i.e., partially autonomous, partially piloted). A robot comprises one or more links, also called structural components, elements, members, or brackets. The links are coupled by joints, for example, bearings, gearboxes, and/or motors. For example, a first link is connected to a second link by a motor and joint or the like. It is possible to describe a robot in terms of the joints or the links. FIGS. 4A and 4B are described in terms of the joints but a person of skill in the art will appreciate a link based description is possible. In particular, this description calls out a motor associated with each joint.

Robot 400 includes appendages, or parts of the robot that are not the body. In various implementations, shoulder motors 402 and 405 may control and sense roll and pitch respectively of a shoulder of a first arm 401 of the robot 400. Each of shoulder motors 402 and 405, and each joint motor in robot 400, work cooperatively with a respective joint, or joint and gearbox. In various implementations roll is adduction (i.e., appendage moves toward torso) and abduction (i.e., appendage moves away from torso) of first arm 401. In various implementations pitch is flexion (i.e., appendage reduces angle between itself torso of more proximal appendage) and extension (i.e., appendage increases angle) (e.g., backward) of first arm 401. In some implementations, the shoulder motors 402 and 405 may be brushed DC motors, for example be AMPFLOW™ high performance model, such as, A28-400 motor produced by POWERHOUSE ENGINEERING INC. of Belmont, Calif., US, in combination with a gearbox. An example of a gearbox is a 225:1 cycloidal gearbox, such as an ONVIO M06 gearbox produced by ONVIO LLC of Salem, N.H., US. In some implementations, the shoulder motors 402 and 405 may include angular position sensors and/or velocity sensors.

In some implementations, the shoulder yaw motor 404 may control and sense the yaw of the first arm 401 of the robot 400. In various implementations, the shoulder yaw motor 404 may be a motor like shoulder motors 402 and 405. Yaw is a motion analogous to medial rotation (i.e., inward rotation toward the body) and lateral rotation (i.e., outward rotation away from the body).

In some implementations, the elbow motor 406, associated gearbox and sensors, controls and senses an elbow of the first arm 401 of robot 400. The elbow motor 406 may be a motor like shoulder motors 402 and 405. The elbow motor 406 may operate in conjunction with a gearbox. The elbow motor 406 may move first arm 401 flexion (i.e., arm curl) and extension (i.e., uncurl).

In some implementations, the wrist 407 may control and sense the position of an element or link on first arm 401 to couple (e.g., physically or mechanically or magnetically directly or indirectly connect, attach, affix, or receive) to an end-effector for the robot 400. In some implementations, wrist 407 includes a compound, or stacked, plurality of prismatic platforms, also known as, parallel platforms. Examples of wrist 407 (and wrist 457) are illustrated and described herein in, at least, FIGS. 7 and 8, and in respective description.

A wrist motor 408 may be disposed between wrist 407 and proximal parts of first arm 401. The wrist motor 408 may control and sense an end-effector rotation of the robot 400. The end-effector rotation may be of the supination and pronation types of motion. In some implementations, wrist motor 408 maybe a motor, gearbox, and sensors, as described herein and including motors for shoulder motor 402 and 405.

Figure 4:
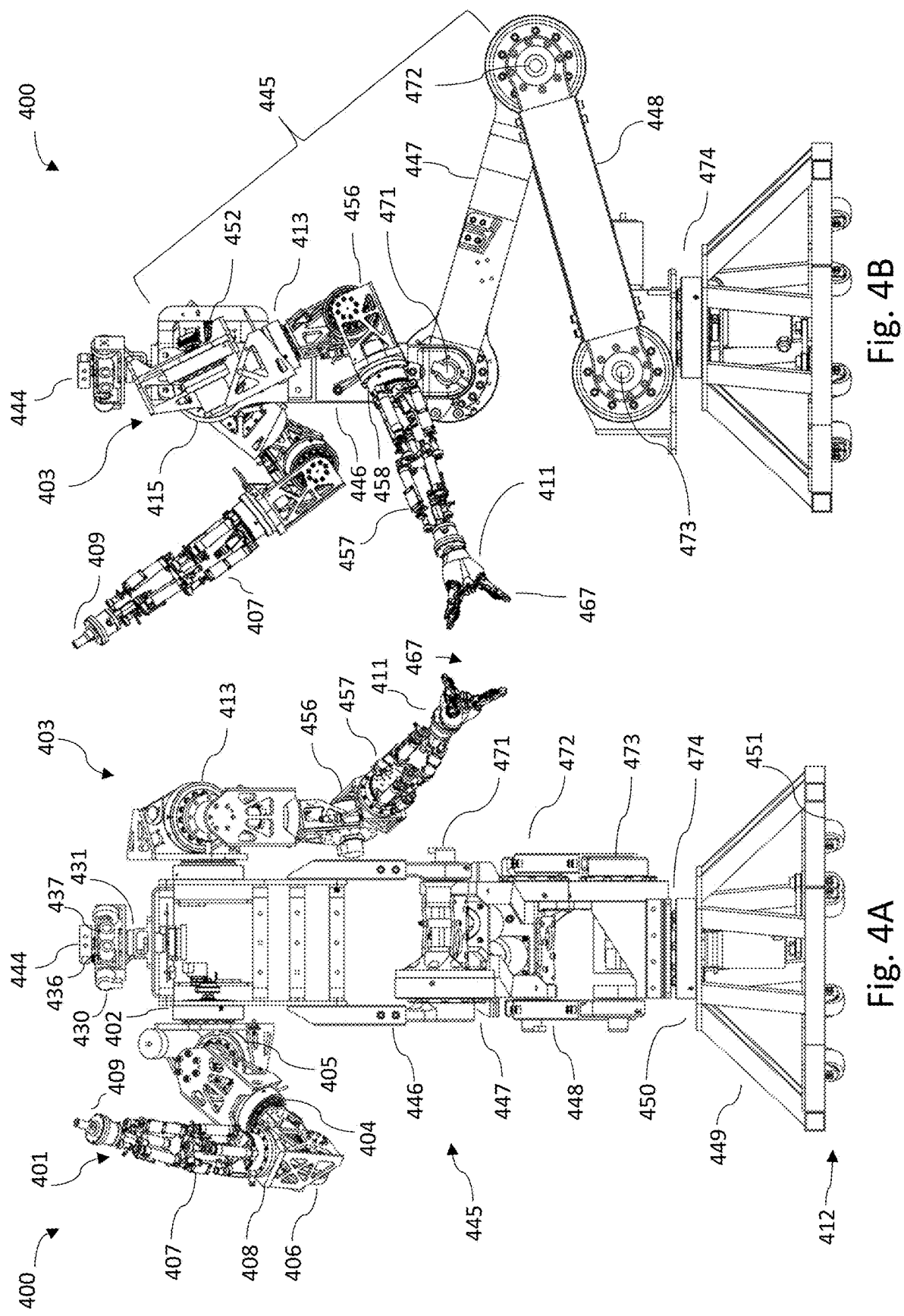
FIGS. 4A and 4B are perspective views illustrating an exemplary robot suitable for inclusion in the system shown in FIG. 1.

In various implementations, arm 401 may be coupled to an end-effector. Arm 401 may include a coupler 409. Coupler 409 can couple to (e.g., physically or mechanically or magnetically directly or indirectly connect, attach, affix, or receive) an end-effector to arm 401 distally of wrist 407. An example of an end-effector, is end-effector 411 included on arm 403. End-effector 411 may include a plurality of digits 467. For example, two fingers and a thumb are shown in FIG. 4. A thumb is generally regarded as a digit that may be used to oppose two more digits. In the case of an opposed pair of digits the thumb may be the short or less mobile digit. The end-effectors may, in some implementations, facilitate dexterous manipulation of items. In some implementations, end-effector 411 is a KINOVA™ KG3™ robotic hand produced by KINOVA ROBOTIQUE of Boisbriand, QC, Calif.

In some implementations, one or more digits of digits 467 of the end-effector 411 may have polymer filled internal and external structure and/or rubber pads proximate to the extremities of the one or more digits of digits 467. The material may, in operation enhance grip capacity of an end-effector and simulate the resistance of a human finger.

In some implementations, digits, such as digits 467, may each have one or more contact sensors and/or pressure sensors to sense pressure applied to the sensor and produce signals proportional to the pressure.

The second arm 403 is generally similar to the first arm 401 but mirrored. Referring to FIG. 4A, the second arm 403 includes a shoulder roll motor 452, a shoulder pitch motor 415, a shoulder yaw motor 413, an elbow motor 456, a wrist motor 458, and end-effector 411 including plurality of digits 467.

In at least one implementation, robot 400 includes one or more components comprising wheels, such as wheels 412, motors (e.g., DC-motors), a speaker, a single board computer (SBC), a head 444, two neck motors or servos (including a head pitch servo 430 and a head yaw servo 431), ear servos, cameras 436 and 437, microphones, lights/LEDs, and cable bundles (various items not shown).

Referring to FIGS. 4A and 4B, robot 400 includes a head 444, coupled to a torso 445 via a servo or motor, such as, head pitch servo 430 and head yaw servo 431. Torso 445 may comprise thorax 446, abdomen 447, and thigh 448. Thigh 448 may be coupled to a base 449 via a joint, e.g., fixed, revolute, revolute and yaw. Robot 400 may include a first revolute pitch joint 471 between base 449 and thigh 448. Base 449 may include a proximal side 450 and distal 451. Thigh 448 may be coupled to proximal side 450. Robot 400 may include a first revolute pitch joint 471 between thorax 446 and abdomen 447. Robot 400 may include a second revolute pitch joint 472 between abdomen 447 and thigh 448. Torso 445 may include a third revolute pitch joint 473 between thigh 448 and base 447.

An abdomen, like abdomen 447, is part of the trunk of a mammal and analogous robot, e.g., robot 400, between hips and bottom of rib cage. A thorax, like thorax 446, is part of the trunk of a mammal and analogous robot between bottom of rib cage and shoulders. A torso, like torso 445, is the trunk of a mammal and analogous robot between hips and shoulder, includes the abdomen and thorax. A thigh, like thigh 448, is the upper part of a leg, e.g., above a knee or articulation point.

In some implementations, wheels 412 provide the capacity for locomotion to the robot 400. The wheels 412 may provide a broad base which, in some examples, increases stability of the robot 400. In other implementations, one or more treads or tracks can provide locomotion.

In various implementations for example, one or more on-board power sources may be found in an electronics compartment. The on-board power sources can, for example include one or more batteries, ultra-capacitors, fuel cells, to independently power different components of the robot 400. One or more motors or servos can be powered by a different battery or batteries to other servos or other systems.

Exemplary batteries include secondary cells, for instance lithium polymer cells, for example, a 16V, 10000 mAh, four cell, LiPo battery; a 4000 mAh 3 cell 12 V battery; a 5 V 9600 mAh, USB mobile charging power pack; and a batter pack including one or more 3.7 V lithium ion batteries. Power busses of lower voltage can be down regulated from a higher voltage source.

In some implementations, robot 400 is coupled to a power source via a power cable. Robot 400 may be powered by an inductive power coupler.

Figure 5:
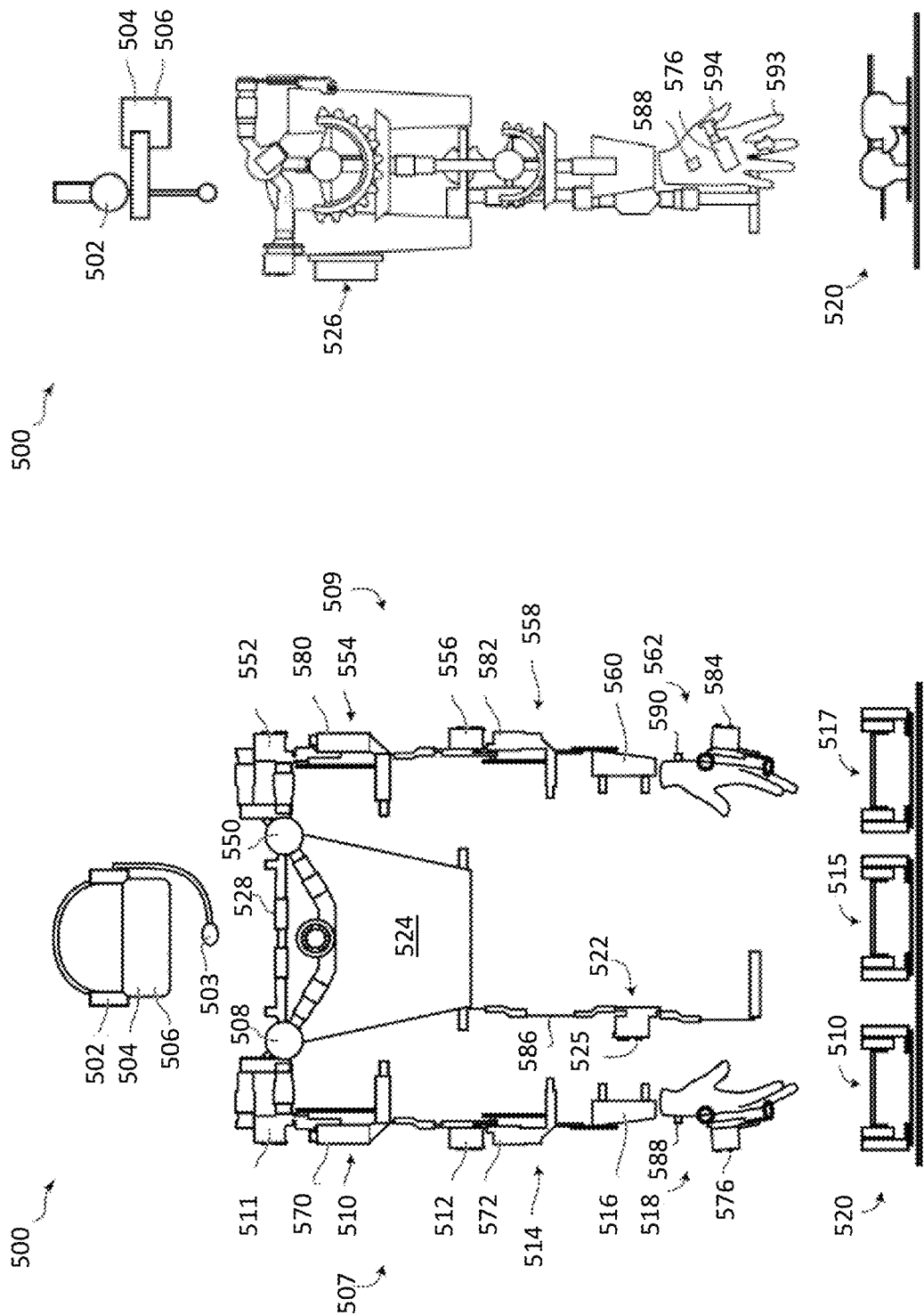
FIGS. 5A and 5B are elevation views illustrating an exemplary operator interface suitable for inclusion in the system shown in FIG. 1.

FIGS. 5A and 5B illustrate aspects and parts of operator interface 500 which is an example of operator interface 104.

FIG. 5A is a front elevation view of the operator interface 500. FIG. 5B is a side elevation view of the operator interface 500 shown in FIG. 5A. The operator interface 500 is designed to be partially worn and partially stood on, and physically engageable by a human operator, such as, human operator 105. The operator interface 500 may include an operator interface processor, computer and processor readable storage device, display, potentiometers, speakers, a microphone, an inertial measurement unit ("IMU"), a haptic glove or manipulator interface, and an input/output ("I/O") interface, all of which are communicatively coupled to (e.g., in communication with) the operator interface processor. As discussed above, in various implementations an operator interface generally similar to the operator interface shown in FIGS. 5A and 5B may include fewer, additional, or alternative sensors, actuators, and/or output devices to those of the operator interface 500 shown in FIGS. 5A and 5B.

The operator interface 500 includes left/right audio output 502, a microphone 503, left/right visual display 504, a head/neck motion sensor 506, and first and second arm sensor assemblies 507 and 509.

The first arm sensor assembly 507 includes a shoulder roll servo 508, a shoulder pitch servo 511, an upper-arm rotation capture device 510, an elbow servo 512, a lower-arm rotation capture device 514, a forearm mount or strap 516, and a manipulator interface or haptic glove 518. The second arm sensor assembly 509 may be generally similar to the first arm sensor assembly 507 but mirrored across a central vertical or sagittal plane of the operator interface 500. The second arm sensor assembly 509 includes a shoulder roll servo 550, a shoulder pitch servo 552, an upper-arm rotation capture device 554, an elbow servo 556, a lower-arm rotation capture device 558, a forearm mount 560, and a manipulator interface or haptic glove 562.

Operator interface 500 includes a set of two or more locomotion pedals 520, such as, first, second, and third locomotion pedals 513, 515, and 517. The operator interface also includes a torso pitch interface 522 including an extension arm and a waist servo 525, a vest 524 that an operator may wear, an electronic back-box 526 and a chest/shoulder suit support structure 528.

In some implementations, the left/right audio output 502 (only one called out in Figures) may be implemented using speakers or headphones to provide an interface for receiving audio information from an operator controllable robot, such as, one of robots 102, or robot 400, to an operator using operator interface 500. In some implementations, the microphone 503 provides an interface to send audio to a human operator controllable robot or may be used to voice to command interface.

The left and right visual displays 504 may provide an interface for to display visual information captured by cameras for the operator controllable robot, e.g., cameras 436 and 437. In some implementations, other visual information may also or alternatively be generated for display on the left and right displays 504. An example of generated information which may be displayed on the left and right visual display 504 is battery charge levels of the operator controllable robot. In some implementations, the generated information includes a metric for a robot as determined by one or more observers. The left and right visual display 504 can be implemented by a virtual reality headset, such as, an OCULUS RIFT™ virtual reality headset, implements the left and right visual display 504, or ALTERGAZE™ virtual reality headset, available, respectively, from Oculus VR of Menlo Park, Calif., US; and Altergaze Ltd of London, UK.

The head/neck motion sensor 506 senses or captures movement of an operator's head, specifically pitch and yaw. In one implementation, the head/neck motion sensor 506 may include a gyroscope, an accelerometer, a magnetometer, and/or another inertial measurement unit (IMU). In various implementations, the head/neck motion sensor 506 is part of, e.g., built into, a virtual reality headset.

In various implementations, the shoulder roll servo 508 and the shoulder pitch servo 511 may sense or capture roll and pitch positions of an operator's shoulder under different roll and pitch. In some implementations, the servos may include feedback resistors or potentiometers that provide signals that represent servo position measurements. In some implementations, the shoulder servos 508 and 511 sense or receive information about and then simulate or replicate positions of corresponding shoulder servos or motors in a robot, e.g., motors 402 and 405 respectively. In some implementations, shoulder servos 508 and 511 are DYNAMIXEL™ AX-12 servos.

Referring still to FIG. 5A, in various implementations, the upper-arm rotation capture device 510 may sense or capture rotation of an upper arm of an operator. In some implementations, the upper-arm rotation capture device 510 includes a first semi-circular gear or gear mechanism that curls or wraps around the upper arm and couples with a second semi-circular gear or gear mechanism at about 90 degrees to the first. In some implementations, the first and second semi-circular gears or gear mechanisms cooperatively transfer the rotation of the upper arm to the rotation of a potentiometer 570 to the second gear or gear mechanism. The potentiometer 570 may be centered on or around the second gear or gear mechanism.

In some implementations, a non-moving part of the potentiometer physically couples to the operator's shoulder. In at least one implementation, the potentiometer has a wider than normal central shaft with a hole in the center. In some implementations, the potentiometer is, for example, a 39/20 mm Center Space Rotary Potentiometer.

In some implementations, the elbow servo 512 may capture or sense an angle of an operator's elbow. For example, in at least one implementation, the elbow servo 512 is a DYNAMIXEL™ AX-12. In some implementations, the elbow servo 512 simulates or replicates positions of the elbow servo of an operator controllable robot, e.g., motor 406.

In some implementations, the lower-arm rotation capture device 514 may capture or sense the rotation of the lower arm of the operator. In some implementations, lower-arm rotation capture device 514 may operate generally similarly to the upper-arm rotation capture device 510. The lower-arm rotation capture device 514 includes a semi-circular gear or gear mechanism that wraps around the lower arm and couples with a second semi-circular gear or gear mechanism at 90 degrees to the first. This gear arrangement may transfer the rotation of the lower arm to the rotation of a potentiometer 572 centered around and connected to the second gear or gear mechanism. In various implementations, a non-moving part of a potentiometer may be fixed to the operator's arm. The potentiometer 572 may, for example, be a 39/20 mm center space rotary potentiometer from PANASONIC CORP. of Osaka, Japan.

In various embodiments, the forearm strap 516 may secure the first arm sensor assembly 507 of the operator interface 500 to the operator. In some implementations, the haptic glove 518 may capture or sense a position of the operator's pointer finger and thumb relative to one another. A servo 576 may be attached to the haptic glove 518 at the center point of rotation of the thumb and pointer finger of the operator. The angle of the servo may be controlled by two armatures 593 and 594 with rings allowing the operator's fingers to couple to the armatures. One armature is attached to the operator glove thumb 594 and the second armature is affixed to the operator glove pointer finger 593. In some implementations, the servo may be configured to provide feedback information garnered from an end-effector of the operator controllable robot (e.g., robot 102) to the fingers of the operator using the operator interface 500 in the form of resistance as the operator guides the operator controllable robot to pick up an item. In some implementations, the haptic glove 518 may use a DYNAMIXEL™ AX-12 servo.

The haptic glove 518 may have a vibrational device (e.g., vibrator) or buzzer 588, to vibrate with an amplitude or frequency that is a function of the signals coming from the finger pressure sensors of the haptic glove 518 of an operator controlled device, such as, robot 400 (FIG. 4). In some implementations, the amplitude or frequency may increase with increasing sensed pressure. The vibrational device 588 may be mounted on the back of the operator interface glove, or elsewhere on the haptic glove.

As discussed above, the second arm sensor assembly 509 mirrors and may be generally similar to the first arm sensor assembly 507. In some embodiments, the upper-arm rotation capture device 554 includes a potentiometer 580, the lower-arm rotation capture device 558 includes a potentiometer 582, and the haptic glove 562 includes a servo 584 and a left vibrational device or buzzer 590.

In some implementations, an operator controls the locomotion pedals 520. An operator generally will selectively use one or both feet to move the pedals. The locomotion pedals 520 are arranged and tuned such that angles sensed or captured by the pedals control the motors 418 of the robot 400 and thus control locomotion of the robot 400. In some implementations, left and right forward motion pedals 517 and 510 may operate independently to trigger both left and right wheels 462 and 412 respectively of the motility subsystem of the robot 400 and facilitate turning of the robot 400.

In some implementations, the locomotion pedals 520 may include a reverse motion pedal 515 configured to control both left and right wheels 462 and 412 shown in FIG. 4. The three pedals may be fixed to a single rubber mat to prevent movement (e.g., slide) during use. In some implementations, each of the locomotion pedals 520 includes a foot platform that rotates, pivots, or swings, a potentiometer to capture the angle of the foot platform, and a spring to return the pedal to a neutral position when the operator's foot is removed. The spring from a domestic mousetrap provides sufficient restorative force for the purpose.

In some implementations, the locomotion pedals 520 may include a pedal for the left drive train, a pedal for the right drive train, and a pedal for reverse. In some implementations, the left and right drive train pedals may provide signals which are combined to calculate a rotational and linear velocity of the operator controllable robot (e.g., robot 400).

In some implementations, a torso pitch interface 522 captures or senses how much an operator has bent forward by the angle of the operator's torso relative to their hips or legs. An extension arm 586 on which a servo 525 is mounted may connect to the operator interface 500 by a hinge. In various embodiments, the extension arm may firmly connect to the operator's upper thigh. The waist servo 525 of the torso pitch interface 522 may, for example, be a DYNAMIXEL™ AX-12 servo.

In some implementations, the vest 524 may provide a mount structure to which components of the operator interface 500 may be attached. The vest 524 may attach and anchor the operator interface 500 firmly to the operator's body.

In some implementations, the electronic back-box 526 (FIG. 5B) may be attached to the vest 524 and may contain electronic components associated with the operator interface 500. In some implementations, the electronic back-box 526 may contain an ARDUINO PRO MINI™ which captures the sensor signals from the potentiometers 570, 572, 580, and 582 and controls mounted on the vest 524, power boards for the DYNAMIXEL™ bus, a power-breakout board which may also act as a patch panel including patch wires for the hand sensor signals and some ground pins, an ODROID™ which handles the wireless adapter for WIFI™ communication as well as a USB2AX, a Universal Serial Bus (USB) to Transistor-Transistor Interface (TTL) connector which allows the ODROID™ to send signals to the DYNAMIXEL™. The ODROID™ may also send signals to the ARDUINO PRO MINI™. The electronic back-box 526 may also contain an ARDUINO UNO™ configured to receive or capture position information from the pedals 520. Other computers, processors and/or boards may be employed. The ARDUINO PRO MINI™ microcontroller is available from Arduino LLC of Somerville, Mass., US. The ODROID™ computer, a processor-based device, is available from Hardkernel Co., Ltd. of Seoul, SK. The chest/shoulder suit support structure 528 allows for suspension of operator interface suit items from the frame rather than from the operator's limbs. In various embodiments, the chest/shoulder suit support structure 528 may facilitate removal of the weight of the operator interface 500 off the operator's arms and onto the operator's shoulder and back.

Figure 6:
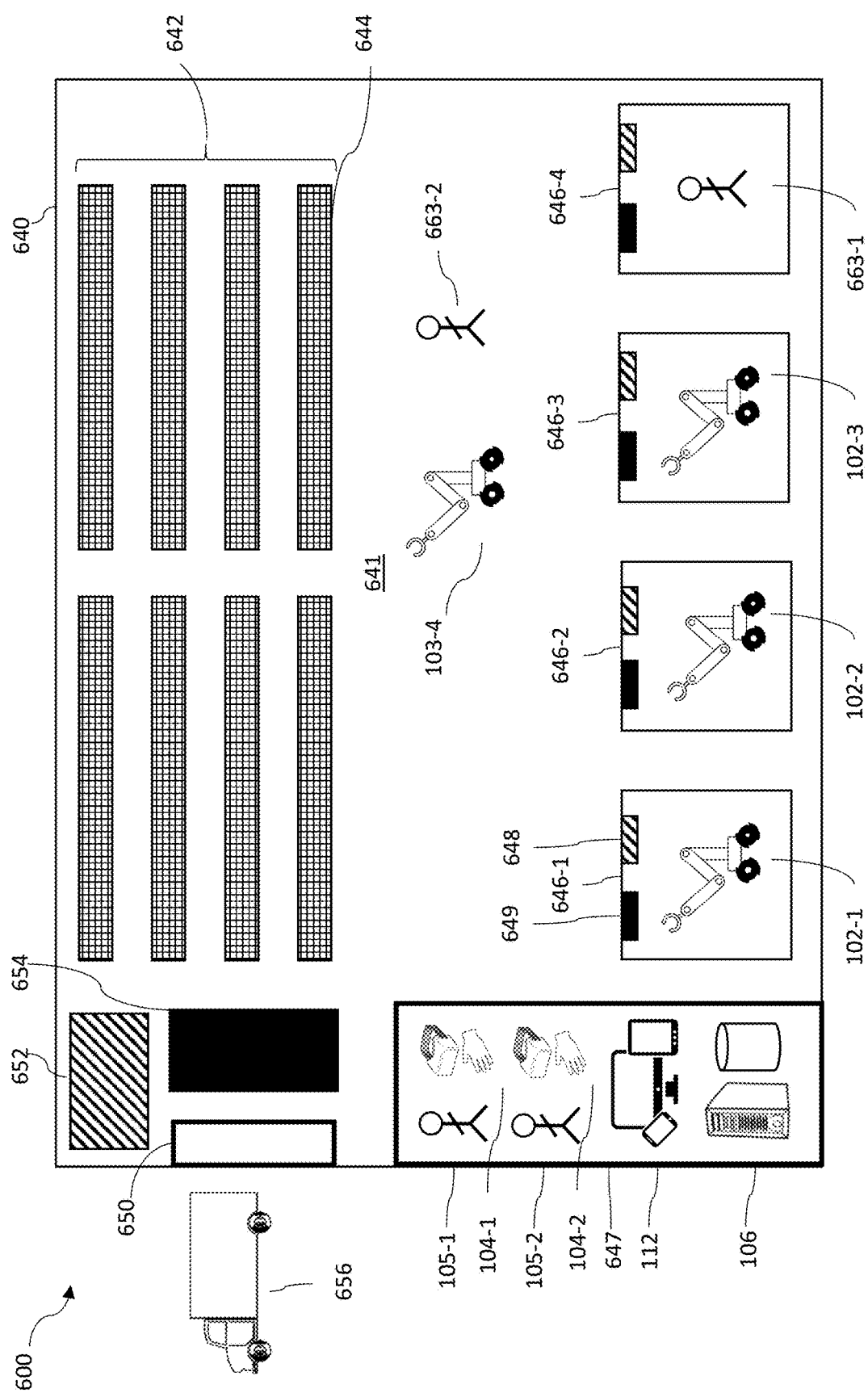
FIG. 6 is a schematic diagram illustrating a work environment.

FIG. 6 shows an exemplary warehouse environment 600 as an example of a workplace environment. Various components of warehouse environment 600 are optional. As shown, the warehouse environment 600 includes one or more robots 102-1, 102-2, 102-3, 102-4 (collectively 102), one or more operator interfaces 104-1, 104-2 (collectively 104), and one or more computer systems 106, in at least pairwise communication with each other via at least one communication channel 108 (not shown in FIG. 6). The warehouse environment 600 may include a building envelope 640, a floor 641, and a storage area 642, including at least one shelving unit 644, rack, or other storage. The warehouse environment 600 may include one or more stations, e.g., station 646-1, station 646-2, station 646-3, and station 646-4 (collectively 646). While four stations 646 are illustrated, the warehouse environment 600 can include a greater or a fewer number of stations 646. One or more of the robots 102, e.g., robot 102-1, robot 102-2, and 102-3, and/or one or more human workers 663-1 may work in a station 646.

A station 646 may include an inbound area 648 and an outbound area 649. Inbound area 648 and outbound area 649 are called out only for station 646-1 in order to prevent cluttering the illustration. A robot, such as, robot 102-1, or a human worker, such as, worker 663-1, can work in a station 646. The robot 102 or worker 663 can pick orders, unpack returned orders, box orders, unbox returned orders, and the like. Thus, stations 646 may, for example, be a mix of zero or more picking stations, boxing stations, unboxing stations, unpacking stations, and the like.

Warehouse environment 600 may include an operator environment 647. The operator environment 647 may be within envelope 640, in a neighbouring building, or physically removed from and even distance to envelope 640. Operator environment 647 may include one or more human operators, e.g., 105-1, 105-2, who interact with one or more interfaces, e.g., operator interfaces 104-1, 104-2, and/or user interface device(s) 112. Operator environment 647 may include one or more computer system(s) 106. The human operator 105 may pilot or operate robots 102. That is, robots 102 maybe operator controlled devices, piloted robots, or the like. One or more robots 102 may operate in response to and/or by executing instructions generated or principally generated at an operator interface, for example, operator interface 104-2. For example, a robot, in piloted mode, would execute instructions that cause the robot to simulate actions taken by a human operator at an operator interface. Robots 102 may operate in an autonomous mode executing autonomous control instructions. At least one processor generates processor executable instructions, which when executed, causes at least one of robots 102 to action, e.g., move, manipulate an item. Robots 102 may be selectively operable in an autonomous mode, or operable in a piloted mode by a human operator via an operator interface.

Robots 102 may operate in a hybrid manner where the robot is in piloted mode for one or more tasks in a pipeline of tasks and is in autonomous mode for one or more tasks in the pipeline. Control of a robot can pass from autonomous mode to piloted mode (or the reverse) during a pipeline of tasks.

The warehouse environment 600 may include an inbound area 652, for receiving items, and an outbound area 654, for dispatching items. These areas 652, 654 may be proximate to a loading bay, such as, loading bay or dock 650. The loading bay 650 may be used for loading and unloading vehicles, such as, a truck 656, or railcars or air or intermodal cargo containers.

Items stored in warehouse environment 600 may be contained with bins with high sides, boxes with small openings, and the like. It takes the dexterity of worker 663 or a robot 102 to remove (or place) items from (or in) these bins or boxes. This dexterity can be compounded by high and low shelving units. That is, the at least one shelving unit 644, rack, or other storage in a storage area 642 may have items stored on low shelves, e.g., about 20 cm above the floor, and on higher shelves, e.g., 350 cm high. In some warehouse operations shelving units are brought to picking stations more stations, e.g., station 646-1. A worker or robot in environments like environment 600 may have to retrieve and place items on shelves of varying height.

Figure 7:
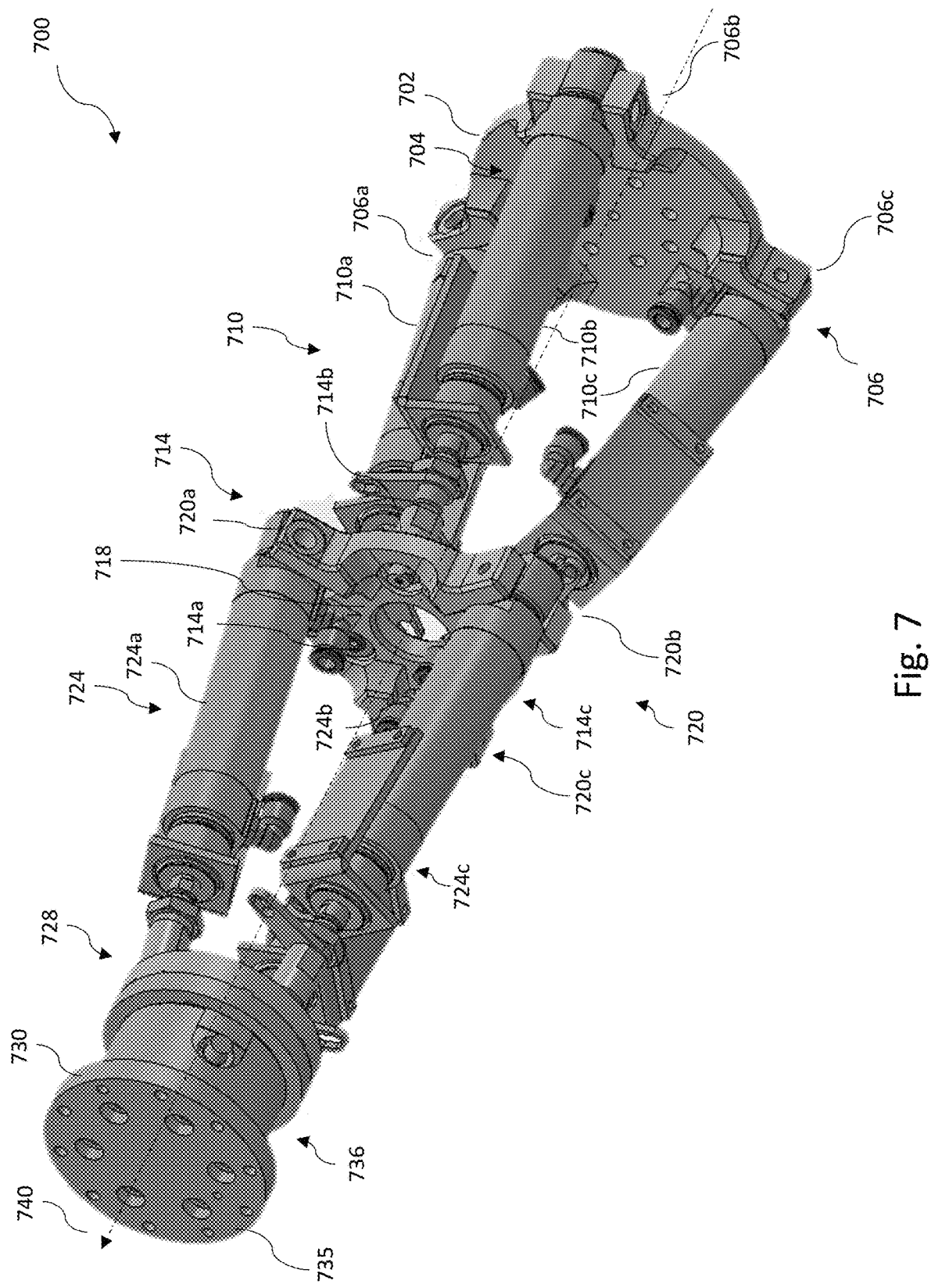
FIG. 7 is a perspective view on a three dimensional model of an apparatus which can form a portion of a robot.
Figure 8:
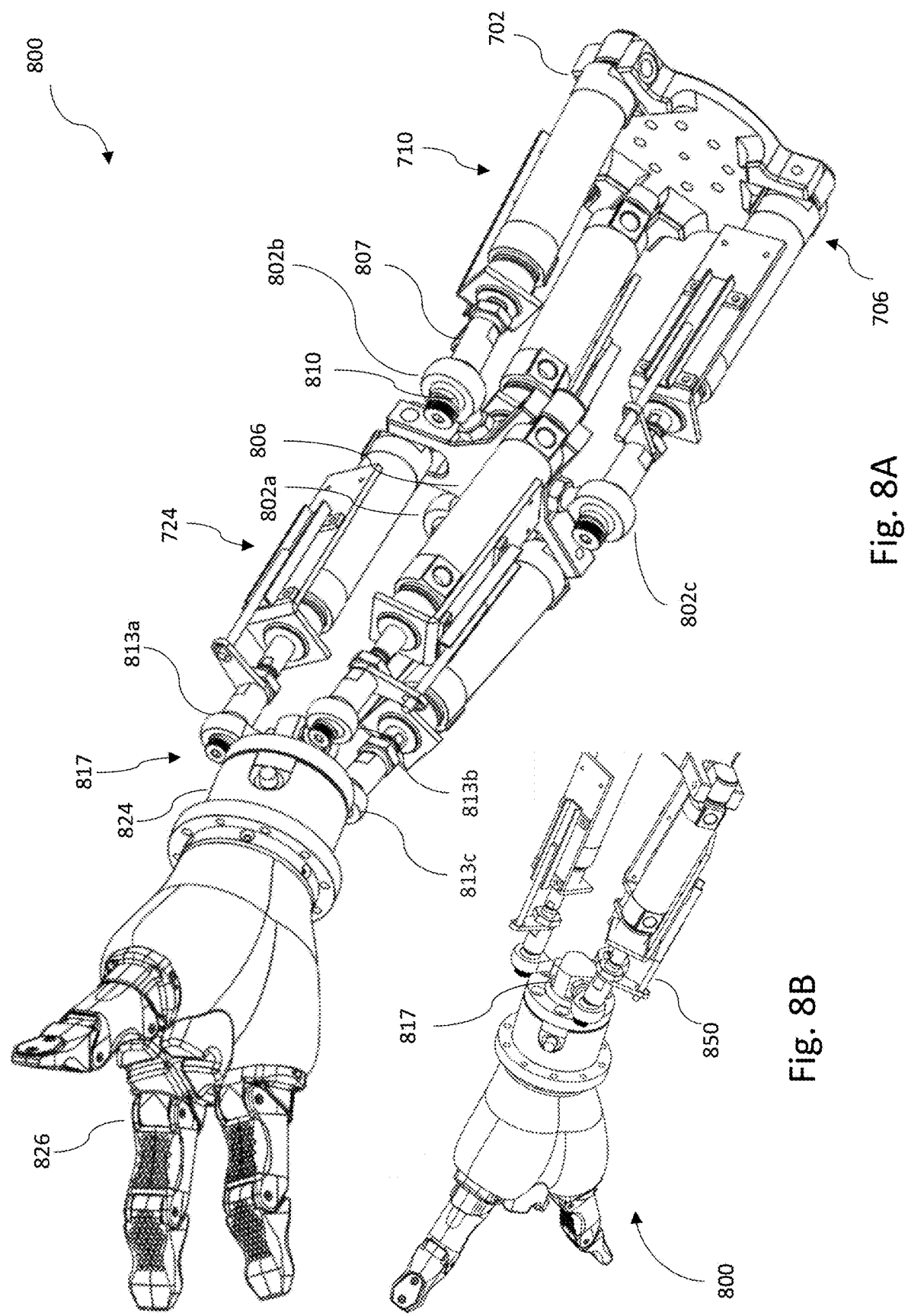
FIG. 8A and FIG. 8B are a perspective views on a three dimensional model of an apparatus with the addition of an end-effector.

FIG. 7 illustrates, in perspective view, an exemplary apparatus 700 for use in robotic systems. Apparatus 700 may be used as wrist 407 and/or wrist 457 in robot 400.

Apparatus 700 includes a base 702. Base 702, a frame or link, includes a proximal side (not shown) and a distal side (704). Base 702 may be formed of metal and constitute the proximal end to apparatus 700. Base 702 includes a coupler, that is, may be coupled (e.g., physically or mechanically or magnetically connected, attached, affixed, received) via its proximal side to a body of a robot, or distal end of an appendage to the robot. That is, a robot appendage or body may receive or be other attached to base 702.

Apparatus 700 includes a first set of revolute joints 706 coupled to (e.g., attached to) base 702. There may be, as illustrated, three joints (e.g., joint 706a, joint 706b, and joint 706c, collectively first set of joints 706). Each joint, in first set of revolute joints 706, may be spaced apart (e.g., evenly) on the base from the other joints. Each revolute joint may include a first side and a second side with an intervening pivot or hinge. The first side revolves about an axis in pivoting relative to the second part. Axes and motions suitable for the description of FIG. 7 are described herein at, at least, FIG. 9. A revolute joint included in first set of revolute joints 706 may be attached to the base 702 on a first side of the joint. A first part of a joint in revolute joints 706 may be included in, defined in, formed from, affixed to, or coupled to base 702. In some implementations, a first side of a revolute joint in the first set of revolute joints 706 is an integral unitary piece of base 702.

In some implementations, apparatus 700 includes a first set of linear or prismatic actuators 710 that extend distally from base 702. A prismatic actuator, like prismatic actuators 710, has a translational degree of freedom. There may be, as illustrated, three linear actuators (e.g., actuator 710a, actuator 710b, and actuator 710c, collectively, first set of linear actuators 710). Each actuator in linear actuators 710 includes a proximal end and a distal end. For example, the proximal end is a housing and the distal end is a moving rod. Each actuator may be regarded as a link in a linkage. A second part of a joint in the first set of revolute joints 706 may be included in, defined in, formed from, affixed to, or coupled to the proximal end of a respective linear actuator in the first set of linear actuators 710. For example, the proximal end of a linear actuator could include a trunnion or a clevis to attach to a corresponding linear actuator of the first set of linear actuators 710.

Each linear actuator in the first set of linear actuators 710 includes a cylinder and a rod that extends at least partially from the cylinder and which translates with respect to the cylinder. The rod may be formed with, or coupled to, a piston head at one end thereof, slideably received in an interior of the cylinder. Each of the linear actuators in the first set of linear actuators 710 may be fluidically coupled to a source of pressurized fluid (e.g., gas, liquid), which is controlled to provide a drive force to the piston head to cause the rod to translate with respect to the cylinder.

In some implementations, apparatus 700 includes a first set of spherical joints 714. There may be three joints in the first set of spherical joints 714. For example, apparatus 700 as shown includes joint 714a, joint 714b, and joint 714c. A representative joint in the first set of spherical joints 714 is a manufactured joint, or coupling, including a partially spherical end of a member or link that lies in a socket of corresponding curvature. This is analogous to the hip joint on a human. The ball may be labeled a first side of the joint and the socket the second side or vice versa. A spherical joint allows multidirectional movement and rotation without the translation of axial motion.

A first part of a joint in first set of spherical joints 714 may be included in, defined in, formed from, affixed to, attached, or coupled to the distal end of a linear actuator in linear actuators 710.

Apparatus 700 includes a frame or link 718. Link 718 may be denominated as a first platform, or a second base. Linear actuators 710 are mechanical coupled to at least the link (i.e., first platform or second base) 718. That is, there are many ways to get to second base. Link 718 may be formed and shaped substantially as base 702. Link 718 may have less area and mass. Link 718 though termed a "platform" need not be a raised level surface. A second part of a joint in spherical joints 714 may be included in, defined in, formed from, affixed to, or coupled to link 718. Spherical joints 714 are spaced or arrayed apart (e.g., evenly spaced angularly about an axis) in or on link 718.

In some implementations, apparatus 700 includes a second set of revolute joints 720. For example, there may be three revolute joints (e.g., joint 720a, joint 720b, and joint 720c, collectively second set of revolute joints 720). Each joint in second set of revolute joints 720 may be spaced apart from each other (e.g., evenly spaced angularly about an axis), and spaced apart from the first set of spherical joints 714. A first part of a joint in revolute joints 720 may be included in, defined in, formed from, affixed to, or coupled to link 718.

In some implementations, apparatus 700 includes a second set of linear actuators 724. There may be, as illustrated, three linear actuators (e.g., actuator 724a, actuator 724b, and actuator 724c) in the second set of linear actuators 724. A linear actuator in linear actuators 724 may be coupled via its proximal end to the second side of one of the revolute joints in the second set of revolute joints 720.

The second set of linear actuators 724 may be identical to or substantially similar to the first set of linear actuators 710. Second set of linear actuators 724 may be lighter, shorter, longer, or the like with respect to the first set of linear actuators 710. Linear actuators 710 or 724 may be electric, hydraulic, pneumatic, or the like.

Apparatus 700 may include a second set of spherical joints 728. Joints in the second set of spherical joints 728 may be identical to or substantially similar to joints in the first set of spherical joints 714. There may be three joints in the second set of spherical joints 728. A joint in the second set of spherical joints 728 may be coupled via a first side of the joint to a distal end of a linear actuator in linear actuators 724.

Apparatus 700 includes a member, frame, element, or link 730. Link 730 may be denominated as a second platform, but need not be a raised or level body. Link 730 may be coupled to spherical joints 728. Spherical joints 728 may be spaced apart from each other and/or apart from the first set of revolute joints 714. Link 730 includes a proximal and distal side. Link 730 may include a distal face 735. Link 730 may include a revolute joint with axis of rotation generally in line with principal axis 740 of apparatus 700. Link 730, link 718, and base 702 may, for example, be formed from 6061 aluminum.

Figure 9:
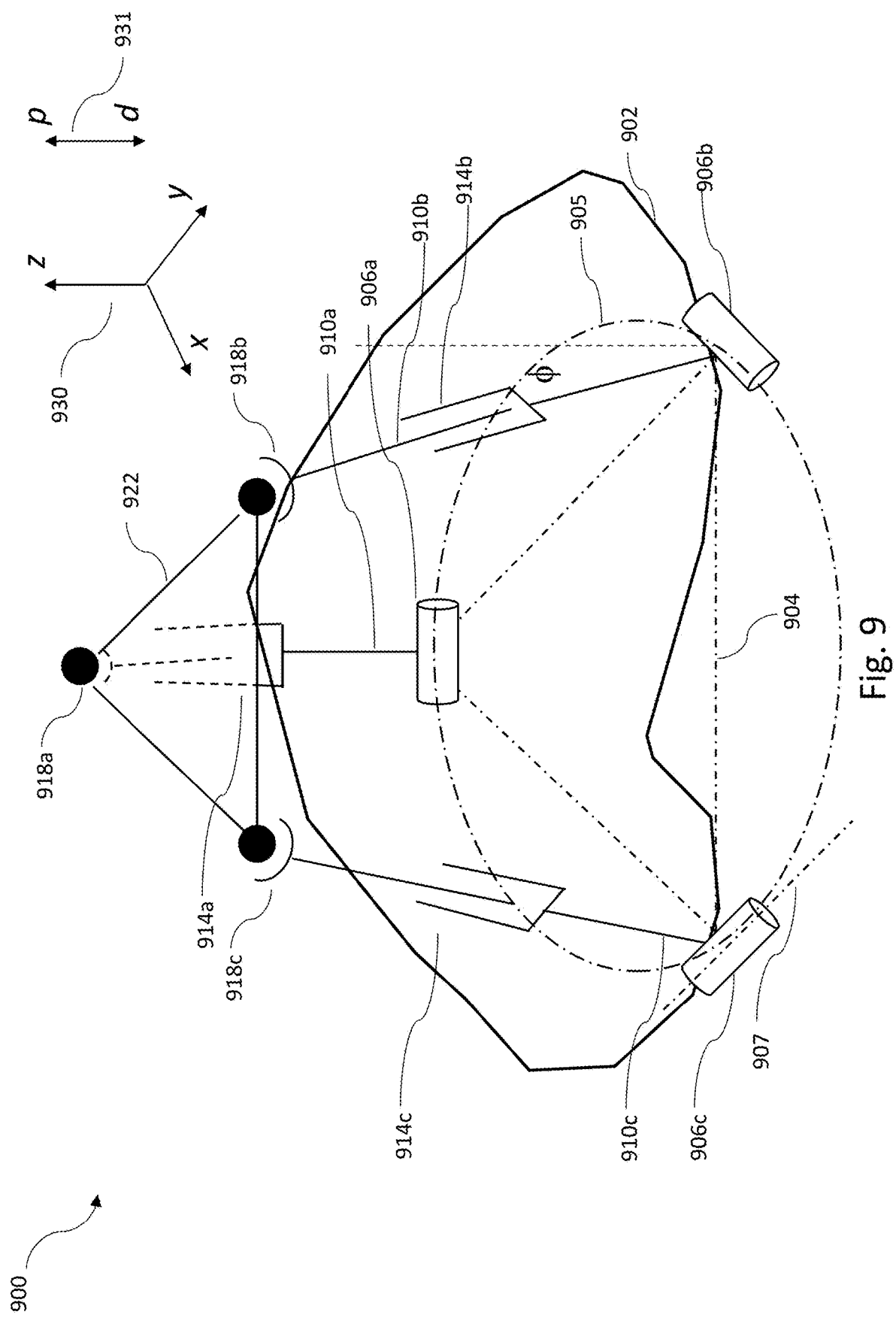
FIG. 9 is a schematic diagram of a prismatic platform.

The mechanics of operation of apparatus 700 are described herein at, at least, FIG. 9. Elements of a control system for apparatus 700 are described herein, for example at FIG. 10.

Linear actuators, such as linear actuators 710 or 724, may extend inward or toe inward at a length of the apparatus 700 is traversed from the proximate end to the distal end thereof. For instance, a radius, diameter, circumference, perimeter or area of the first platform 718 may be smaller than the corresponding dimension of the base 702. Also for instance, a radius, diameter, circumference, perimeter or area of the second platform 730 may be smaller than the corresponding dimension of the first platform 718. For example, there may be a respective direct line distance between each pair of spherical joints of the first set of spherical joints 714 that is less than a respective direct line distance between each pair of revolute joints of the first set of revolute joints 706. There may be a respective direct line distance between each pair of spherical joints included in the second set of spherical joints 728 is less than a respective direct line distance between each pair of revolute joints included in the second set of revolute joints 720.

A linear actuator in linear actuators 710 or 724 may be characterized in part by a principal axis running it length. Linear actuators 710 and/or linear actuators 724 may extend inwardly along a proximal to distal run of a linear actuator. For example, in a set of linear actuators, e.g., linear actuators 710 or 724, for at least one pair of linear actuators the principal axes of the pair converge at least one point.

In some implementations, linear actuators 710 and/or linear actuators 724 are 25 mm diameter and 40 mm stroke pneumatic actuators. For example, apparatus 700 can includes FESTO™ DSN-25-40-P actuators, from FESTO AG & CO. KG, of Esslingen am Neckar, Germany, and sales office in Hauppauge, N.Y., USA. Further aspects of pneumatic actuators are shown and described herein, at least, at FIG. 10.

Apparatus 700 can be described as including two prismatic platforms or two prismatic manipulators. There are also known as parallel platforms or parallel manipulators. The term parallel denotes a connection type, i.e., in series, in parallel, and not a relative orientation. A prismatic platform includes two or more linkages that each couple a platform to a frame or base. Further the linkages include at least one prismatic joint. The platform may be translated and rotated per the constraints provided by the two or more linkages. A linkage includes at least one frame, structure, element or link, i.e., link, and at least one joint, e.g., revolute joint, prismatic joint. Apparatus 700 can be described as including a proximal prismatic platform comprising revolute joints 706, linear actuators 710, spherical joints 714, and link 718; and distal prismatic platform comprising revolute joints 720, linear actuators 724, spherical joints 728, and a distally placed link, e.g., link 730. An intermediate prismatic platform may be disposed between and coupling proximal prismatic platform and the distal prismatic platform.

FIG. 8A and FIG. 8B illustrate, in perspective view, an exemplary apparatus 800 for use in robotic systems. Apparatus 800 may be used as wrist 407 and/or wrist 457 in robot 400.

Referring to FIG. 8A, apparatus 800 share many components and arrangements as apparatus 700, such as base 702, first set of linear actuators 710, and so on. However, at least one of the first and the second platforms do include a second part of a spherical joint.

Apparatus 800 includes a first set of spherical joints 802. The first set of spherical joints 802 includes joint 802a, joint 802b, and joint 802c. A second part of a joint in the first set of spherical joints 802 may be affixed to, or coupled to link 806. For example, joint 802b includes a first part 807 and a second part 810. Second part 810 of is coupled to link (i.e., first platform) 806.

Apparatus 800 includes a second set of linear actuators 724. The linear actuators couple link (i.e., first platform) 806 to a second set of spherical joints 813. Second set of spherical joints 813 includes a first joint 813a, a second joint 813b, and a third joint 813c. Second set of spherical joints 813 are coupled to link (i.e., second platform) 817.

Apparatus 800 includes a load cell 824, e.g., single degree of freedom (DOF) load cell, multi-DOF load cell, such as, 6-DOF load cell, 12-DOF load cell. A single DOF load cell measures force along a single axis. A 6-DOF force-torque load cell measures forces along three axes and torques described by three angles.

Apparatus 800 includes an end effector 826. Load cell 824 can receive or otherwise be attached or coupled to end effector 826. In some implementations, end effector 826 is a KINOVA™ KG3™ robotic hand produced by KINOVA ROBOTIQUE of Boisbriand, QC, Calif.

FIG. 8B is a view of apparatus 800 from a different angle than that of FIG. 8A. The scale of the view is also different. The size and location of link 817 is clearer in this view.

In some implementations, linear actuators include linear constraints, e.g., constraint 850 (only one called out in FIG. 8B). A constraint may include a member moving in sliding engagement in a channel or void. A constraint prevents or reduces axial motion of one part of a linear actuator relative to another part.

FIG. 9 is a schematic view of prismatic platform 900. A prismatic platform includes two or more linkages that couple a platform to a frame or base. The platform may be translated and rotated per the constraints provided by the two or more linkages. The linkages connect a platform to a base or fixed link are in parallel. The platform can assume a non-parallel relative orientation. A linkage includes at least one member or element, i.e., link, and at least one joint, e.g., revolute joint, prismatic joint. Prismatic platform 900 includes a base or frame 902. Base 902 may be a unitary link or a plurality of links fixed together. A plurality of revolute joints 906 are coupled to, or defined at least in part within, base 902. The plurality of revolute joints 906 may be arranged in an imaginary triangle 904; alternatively equality spaced on an imaginary circle 905. As shown, plurality of revolute joints 906 includes joint 906a, joint 906b, and joint 906c.

Each joint in plurality of revolute joints 906 includes an axis of rotation that lies parallel to the principal plane of base 902. Each joint includes a first part and a second part, wherein the first part and the second move in a revolute way with respect to each other around the axis of rotation for the joint. An example, of an axis is axis 907. The first part of the joint may be included in, defined in, formed from, affixed to, or coupled to base 902. The second part of a joint may be included in, defined in, formed from, affixed to, or coupled to a link extending upwardly from base 902.

Prismatic platform 900 includes a plurality of links 910 extending upwardly from base 902. Plurality of links 910 includes link 910a, link 910b, and link 910c. Each link includes a proximal end, near base 902, and a distal end. A link in plurality of links 910 may be a binary link, i.e., connected to two joints.

The plurality of links can include a plurality of linear or prismatic actuators 914, wherein the linear actuator(s) selectively extend and contract the link(s) along a principal axis of the link. In some implementations, the linear actuator(s) selectively extend the link(s) generally away from base 902 and selectively contract the link(s) generally toward base 902. Plurality of linear actuators 914 includes actuator 914a, actuator 914b, and actuator 914c.

Prismatic platform 900 includes a plurality of spherical joints 918. The distal end of a representative link in plurality of links 910 is coupled to a spherical joint in plurality of spherical joints 918. A spherical joint is a joint including a first part and a second part that move with respect each other over two independent rotational degrees of freedom, that is, moves with ball and socket motion. Further, an axial torque applied a first part of a spherical joint, e.g., joint 918a, does not rotated the second part. The first part of a joint, e.g., joint 918b, may be included in, defined in, formed from, affixed to, or coupled a distal end of a corresponding link, e.g., link 910b. The second part of a joint e.g., joint 918c, may be included in, defined in, formed from, affixed to, or coupled to a link distally placed relative plurality of links 910.

Prismatic platform 900 includes a link or platform 922 located to the distal side, and coupled to plurality of links 910 via spherical joints 918. The second parts of spherical joints 918 maybe arranged on an imaginary triangle; alternatively equality spaced on an imaginary circle. Platform 922 may move via the actuation of one or linear actuators. Prismatic platform 900 extend or contract, i.e., proximal-distal motion, denoted by z-axis in set of axes 930 or axis 931. Platform 922 can tilt by polar angle, θ, between normal of platform 922 and x-y plane. Equivalently the normal of platform 922 may sweep over $\pi(\sin\theta)^2$ steradians. Platform 922 may not twist, i.e., azimuthal motion in plane x-y plane and/or rotation about axis 931.

In some implementations platform 922 may move relative to base 902 by about 20% of the distance between base 902 and platform 922. In some implementations platform 922 may tilt by, for example, as much as 35 degrees. In some implementations platform 922 may tilt by, for example, as much as 55 degrees.

Figure 10:
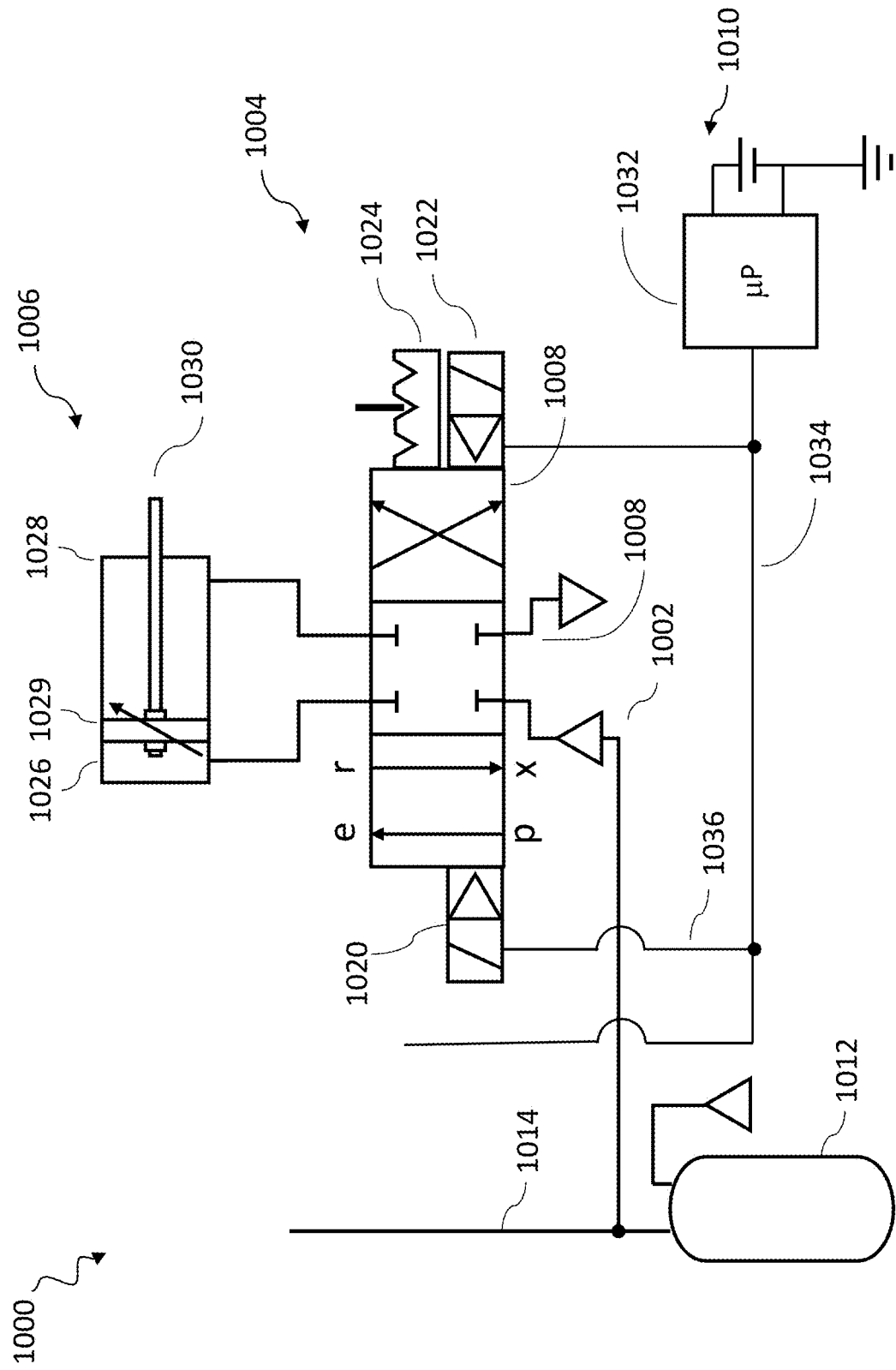
FIG. 10 is a schematic diagram of a compressed fluid actuation or control system.

FIG. 10 schematically illustrates a compressed fluid actuation or control system 1000. Control system 1000 includes a pressure source 1002 (e.g., an inlet check valve) that provides compressed fluid (gas, for instance air; liquid, for instance hydraulic fluid) into a port of a valve 1004. Valve 1004 includes a plurality of ports and is in fluid communication with a linear actuator, for example linear actuator 1006. The operation of valve 1004 controls, in part, linear actuator 1006. Herein fluid communication includes connected by hoses and defines a pressure circuit, e.g., a pneumatic circuit. As illustrated, the compressed fluid circuit completes at exhaust 1008 (e.g., an outlet check valve).

Control system 1000 includes an electronic control subsystem 1010, for example including at least one processor or other logic circuit. Electronic control subsystem 1010 is powered by a voltage source.

A compressor (not shown) or a pressurized reservoir 1012 supplies compressed fluid (e.g., gas, liquid) to valve 1004. Reservoir 1012 may also be in fluid communication with other valves (not shown) via hose(s) 1014.

Valve 1004 are operable in a variety of positions or states. Each position or state is represented as a square box in the illustration of valve 1004. Valve 1004 includes a plurality of ports that selectively provide fluid communication with other components, e.g., hose, actuator, sensor, source, exhaust, and the like. A shown valve 1004 is a 4 port valve with labeled ports: p, e, r, and x; denoting pressure, extend, retract, and exhaust. Valve 1004 may in a first position, e.g., position or state on left in illustration of valve 1004, bring the pressure port into fluid communication with an extend port. Also in the first position or state, a retract port is in fluid communication with the exhaust. Valve 1004 may in a second position or state, e.g., middle position in illustration of valve 1004, which provides no fluid commination between the extend or retract ports and pressure source 1002 or exhaust 1008. Valve 1004 may be operable in a third position or state, e.g., right position in illustration of valve 1004, where the pressure port is in fluid communication with the retract port, and the extend port is in fluid communication with the exhaust port.

Valve 1004 may be actuated between positions or states via a mechanical motion provided by, for example, one or more solenoids, such as, solenoid 1020 and 1022. Valve 1004 may change positions or states, transferring the energy provided by the compressed fluid. Valve 1004 may include a plurality of detents, e.g., detents 1024, to hold the valve in a selected position or state.

Linear actuator 1006 includes an extend chamber 1026 and a retract chamber 1028. The extend chamber 1026 is in fluid communication with the extend port on valve 1004. Retract chamber 1028 is similarly coupled to the retract port. Differential pressure in chamber 1026 versus chamber 1026 acting on a piston head 1029 causes linear movement (i.e., translation) of a coupled drive rod 1030. The drive rod 1030 may be used to move a platform attached to the linear actuator. Linear actuator 1006 may, for example, be a double action type linear actuator. Linear actuator 1006 may, optionally, include double adjustable cushion(s).

Electronic control subsystem 1010 includes a hardware (i.e. circuitry) processor 1032 communicatively coupled to a control bus 1034. The hardware processor 1032 may execute processor-executable control instructions and/or data stored on non-transitory processor-readable media, such as, prismatic platform instructions and data 368. Control bus 1034 is coupled to solenoids 1020 and 1022, e.g., via one or more wires 1036, with our without dedicated controllers (e.g., solenoid controller integrated circuits). Further solenoid 1020, 1022, thus valves, and thus actuator may be coupled to bus 1034 and controlled by subsystem 1010.

Figure 11:
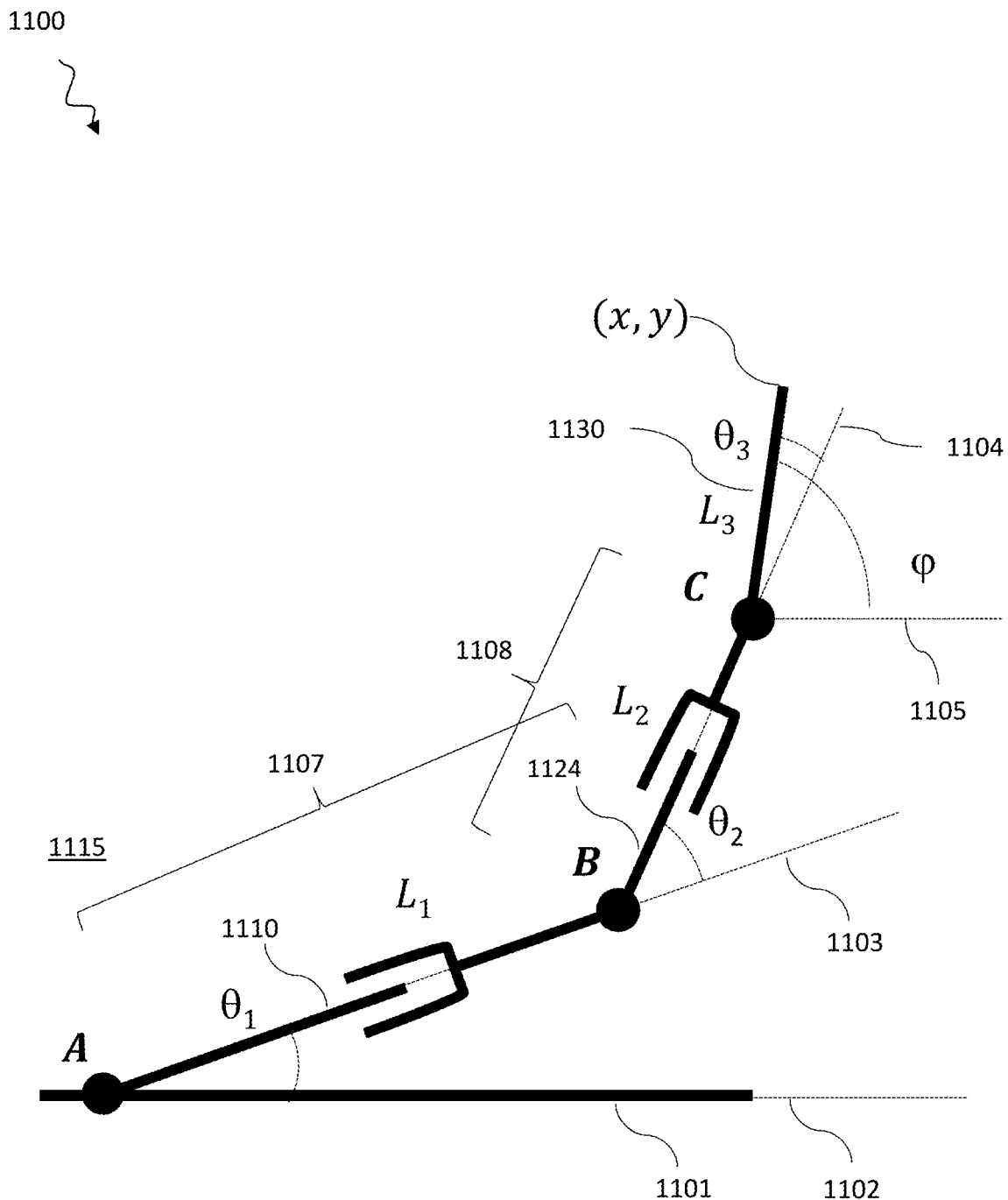
FIG. 11 is a schematic diagram of a compound prismatic platform.

FIG. 11 schematically illustrates a compound prismatic platform, denoted apparatus 1100. For simplicity, but without loss of generality, apparatus 1100 is assumed to lie in a plane coplanar to the drawing sheet. Apparatus 1100 includes a base or link 1101. Link 1101 may be a part of a robot. Apparatus 1100 includes a first prismatic platform 1107, e.g., apparatus 900, and a second prismatic platform 1108.

First prismatic platform 1107 includes a prismatic link 1110 including a first end at location A and a second end, at present, at location B. The prismatic link 1110 includes a plurality of linear actuators, e.g., linear actuators 710, that can extend or retract the prismatic link 1110. The adjustable length of prismatic link 1110 is encoded in length $L_1$. Prismatic link 1110 lies along axis 1103. Axis 1103 meets axis 1102, which is associated with link 1101, or a reference frame, at an angle $\theta_1$. Angle $\theta_1$ may be fixed by a joint in a kinematic chain proximally placed relative to link 1101.

A platform at the end of prismatic platform 1107 can be modelled as providing a revolute joint at location B and defining axis 1104 and angle $\theta_2$. Angle $\theta_2$ is relative to axis 1103. That is, the operation prismatic platform 1107 results in an angular displacement of a superior platform included in prismatic platform 1107. See FIG. 9.

Second prismatic platform 1108 includes a prismatic link 1124 comprising a first end at location B and a second end at location C. The prismatic link 1124 includes a plurality of linear actuators, e.g., linear actuators 724, that can extend or retract the prismatic link 1124. The length of prismatic link 1124 is encoded in length $L_2$. Prismatic link 1124 lies along axis 1104.

Prismatic platform 1108 includes a platform at the distal end of prismatic platform 1108. The prismatic platform 1108 can be modelled as providing a revolute joint at location C and defining angle $\theta_3$. Angle $\theta_3$ is relative to axis 1104. Apparatus 1100 includes a link 1130 of fixed length $L_3$.

Locations A, B, and C can be encoded in matrices A, B, and C. A target pose can be denoted by x, y, and φ where φ is relative to an axis 1105 aligned with axis 1102. Given a target pose a controller for apparatus 1100 can calculate, via inverse kinematics, individual displacements and joint angles. A controller can convert these joint angles into displacements of linear actuators. Assume that apparatus 1100 operates in plane 1115 and angle $\theta_1$ is fixed. Then the controller may solve equations including:

$$\begin{bmatrix} x \\ y \end{bmatrix} = A + L_1 e^{j\theta_1} + L_2 e^{j(\theta_1+\theta_2)} + L_3 e^{j(\theta_1+\theta_2+\theta_3)} \qquad (1)$$

$$\theta_1 + \theta_2 + \theta_3 + \pi = \varphi \qquad (2)$$

Here j is the imaginary number. The lengths of prismatic platforms 1107 and 1008 and the angle they create are coupled. However, this can be accounted for by the range of motion of the included prismatic links, i.e., prismatic links 1110 and 1124. Further constraints can be added by fixing the locations A, B, and/or C, and/or angle, such as, $\theta_3$. A controller for apparatus 1100 may impose further constraints or receive further constraints. The constraint of planar motion for apparatus 1100 is in practice a mathematic convenience since a more proximally placed yaw joint, e.g., wrist motor 408, can move the plane of motion, i.e., plane 1115.

In some implementations, apparatus 1100 further comprises a set of one or more links (e.g., bodies)(not shown) that extends the reach of apparatus 1100. The set of one or more links may be disposed proximally, e.g., near link 1101, between link 1101 and link 1110. Apparatus 1100 may further comprise a set of one or more joints (e.g., revolute joints) that couples the first set of one or more links together. The set of one or more joints may couple the set of one or more links to link 1101, a body at locations A, B, or C (e.g., a base or a platform); link 1130; or the like.

Figure 12:
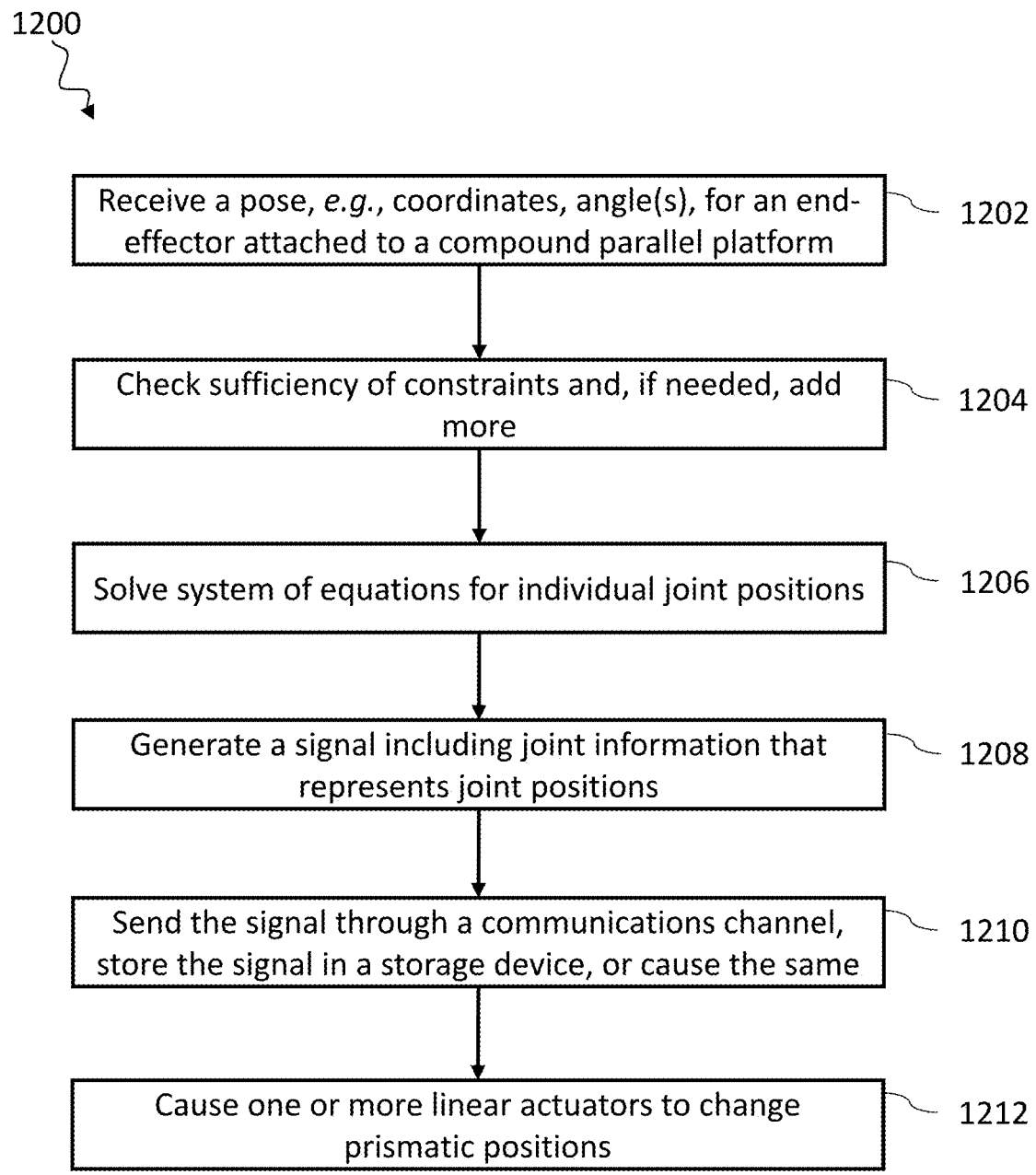
FIG. 12 is a flow-diagram illustrating an implementation of a method of operation for of a system including a robotic apparatus.

FIG. 12 shows method 1200 executable by a controller, such as circuitry or at least one hardware processor, for operation in a robotic system. Method 1200, in part, describes how a controller may determine a pose of a robot end-effector, and, optionally cause the robot to assume the same pose. Those of skill in the art will appreciate that other acts may be included, removed, and/or varied or performed in a different order to accommodate alternative implementations. Method 1200 is described as being performed by a controller, for example, a controller subsystem or processor (s) in computer system 106 in conjunction with other components, such as, apparatuses 700, 800, 900, and 1100. However, method 1200 may be performed by multiple controllers or by another system.

For performing part or all of method 1200, the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. The hardware processor(s) may, for example, execute one or more sets of processor-executable instructions and/or data stored on one or more nontransitory processor-readable media. The hardware processor(s) may, for example, execute one or more sets of processor-executable instructions and/or data stored on one or more nontransitory processor-readable media. For performing part or all of method 1200 one or more robots may be included in the operation of a robotic system. Exemplary robots are described herein.

Method 1200 begins, for example, in response to an invocation by the controller. At 1202, the controller receives a pose for a robot end-effector attached to a compound parallel platform, e.g., end-effector 411, end-effector 826. The pose may be, or may include or may specify, a pose for a coupler (e.g., coupler 409) or an element (e.g., link 730, load cell 824) proximal to an end-effector. For example, the controller receives an offset, height, and angle for an end-effector, that is, x, y, and φ as defined in FIG. 11. The controller may receive an offset, height, and angle for a more proximally placed component of apparatus 1100.

At 1204 the controller checks sufficiency of constraints. For example, the controller determines if the pose requested is constrained for a solution. If not, the controller can impose one or more default constraints, such as, keeping a link or joint stationary.

At 1206, the controller solves a system (e.g., set) of equations for individual joint positions, e.g., joint angles and prismatic positions. For example, $\theta_3$, $L_1$, and $L_2$. The solution may be exact or may be a range of solutions. See above at FIG. 11 for examples of the set of equations for joint angles and prismatic positions.

At 1208, the controller generates a signal including joint information that represents the joint positions, e.g., joint angles and prismatic positions. For example, the joint information is processor-readable information that defines linear displacements for actuators 710a, 710b, and 710c, or actuators 724a, 724b, and 724c, or angles for body 718 or boy 730. The joint information may follow conventions defined in Figures and related description herein including FIG. 9 and FIG. 11.

At 1210, the controller may send the signal through a communications channel, e.g., communication channel(s) 108, or cause the signal to be send through the communications channel. At 1210, the controller may store the signal or cause the signal to be stored in a storage device, e.g., nontransitory tangible computer- and processor-readable storage device(s) 110.

At 1212, the controller causes one or more linear actuators change prismatic positions and thus, in some cases, joint angles based on the signal or the joint information that represents joint positions.

Method 1200 ends until invoked again.

Figure 13:
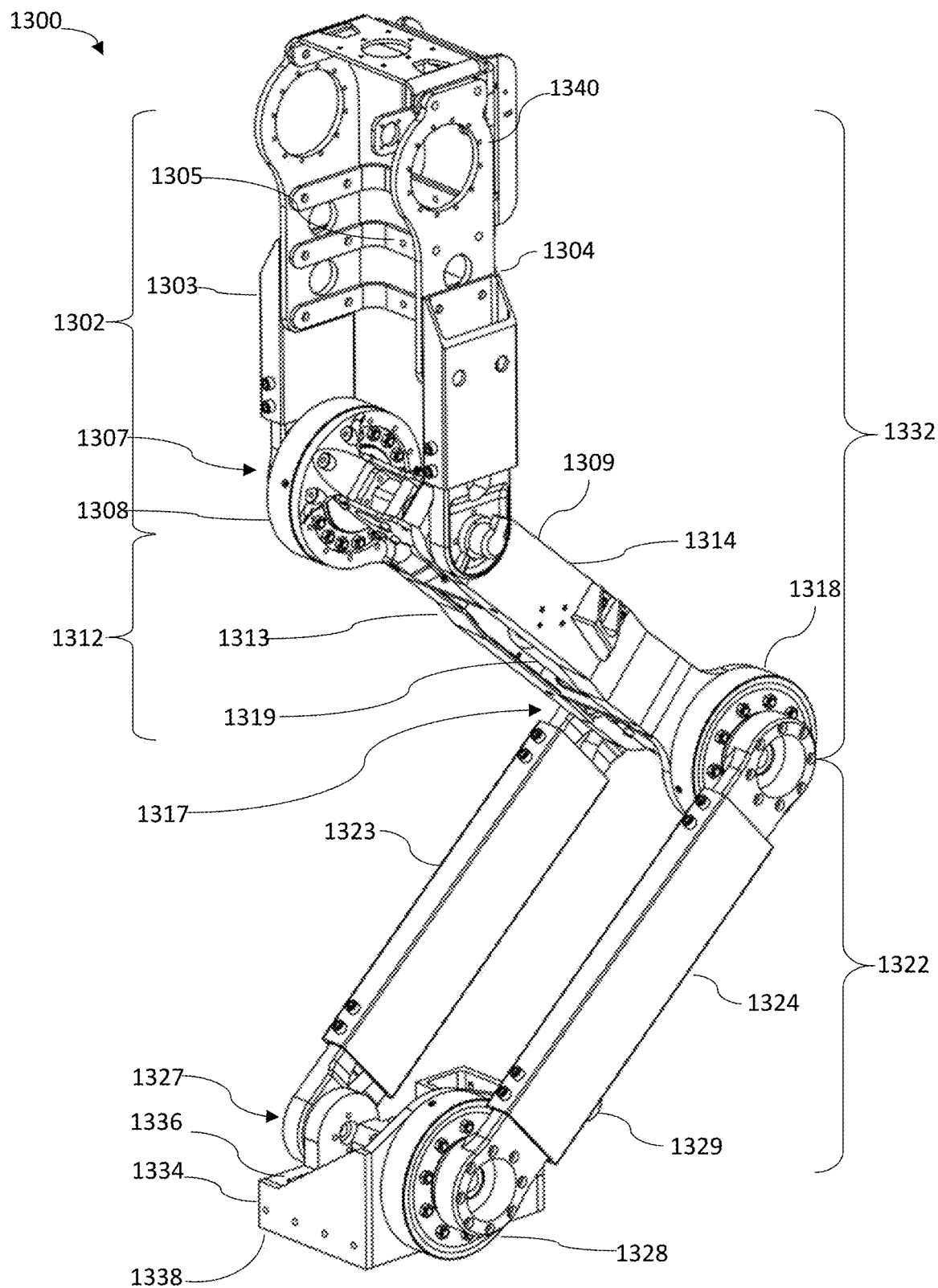
FIG. 13 is a perspective view of an apparatus which can form a portion of a robot.

FIG. 13 illustrates, in perspective view, an exemplary apparatus 1300 for use in robotic systems. Apparatus 1300 may form a portion of a robot. For example, the apparatus 1300 may be used as a torso 445 and thigh 448 in robot 400.

Apparatus 1300 includes a thorax 1302. Thorax 1302 is a frame or at least one link, element, or member. Thorax 1302 includes in some embodiments a plurality of rails or stiles. For example, rail 1303 and rail 1304. The rails may, as shown, spaced apart and extend cooperatively and in some cases in parallel. Rail 1303 and rail 1304 may be joined by one or more struts, e.g., strut 1305. Thorax 1302 (e.g., rail 1303, rail 1304, strut(s)) may be formed of metal.

Apparatus 1300 includes a first joint 1307. First joint 1307 is a revolute joint including at least one degree of rotational freedom about an axis generally transverse to rail 1303 and rail 1304. That is, first joint 1307 may be arranged as a pitch joint, i.e., in motion cases thorax 1302 to pitch forward and backwards. First joint 1307 includes, or is physically coupled to, a gearbox 1308. Gearbox 1308 may be a non-backdriveable or self-locking gearbox, e.g., cycloidal gearbox. Gearbox 1308 may be driven by a motor 1309. Motor 1309 includes a housing (better shown in FIG. 14.) A motor, e.g., motor 1309 in apparatus 1300 may be mounted, via an included housing, longitudinally or transversely. Motor 1309 may, for example, be a DC brushed motor.

Apparatus 1300 includes an abdomen 1312 placed in an inferior position to thorax 1304. Abdomen 1312 includes one or more rails, e.g., rail 1313 and rail 1314. Rail 1313 and rail 1314 are counterparts to each other. The rails may, as shown, be spaced apart extend cooperatively each with a reversing pair of dog leg bends. In some implementations, rail 1313 and rail 1314 are the identical parts, simply reoriented with respect to one another. The rails 1313, 1314 may be joined by one or more struts. First joint 1307 couples thorax 1302 to abdomen 1312.

Apparatus 1300 includes a second joint 1317. Joint 1317 is a revolute joint including at least one degree of rotational freedom generally parallel to the axis of first joint 1307. That is, second joint 1317 may be a pitch joint. Second joint 1317 includes, or is coupled, to a gearbox 1318. Gearbox 1318 may be non-backdriveable. Gearbox 1318 may be driven by a motor 1319. Motor 1319 includes a drive shaft and a housing. Second joint 1317 couples abdomen 1312 to a thigh 1322 in an inferior position to abdomen 1312.

Thigh 1322 includes one or more rails, e.g., rail 1323 and rail 1324. Each of rail in the following rail pairs may be a counterpart rail or link to the other rail in the pair: rail 1303 and 1304; rail 1313 and 1314; and rail 1323 and 1324. Thigh 1322 runs in the distal direction and either ventral or rostral direction relative to torso 1304. Abdomen 1312 has a superior position to thigh 1322.

Apparatus 1300 includes a third joint 1327. Third joint 1327 is a revolute joint including at least one degree of rotational freedom generally parallel to the axis of first joint 1307. That is, third joint 1327 may be a pitch joint. Third joint 1327 includes or is coupled to a gearbox 1328. Gearbox 1328 may be non-backdriveable. Gearbox 1328 may be driven by a motor 1329. Third joint 1327 couples the distal end of thigh 1322 to a link or element in an inferior position, e.g., calf 1334. Calf 1334 can include a proximal side 1336 and distal side 1338.

Apparatus 1300 includes a torso 1332 comprising thorax 1302 and abdomen 1312. Thorax 1302 may extend vertically from first joint 1307. Torso 1332 can include one or more couplers, e.g., coupler 1340. Coupler 1340 can couple (e.g., physically or mechanically or magnetically directly or indirectly connect, attach, affix, or receive) one or appendages of a robot, e.g., received by thorax 1302, received by a coupler included in thorax 1302. The one or more appendages may be attached to torso 1332 with fasteners (e.g., bolts, nuts, screws, clamps).

Apparatus 1300 is an arc linkage, or open chain linkage. A linkage includes a plurality of bodies, that is, links, coupled together by at least one joint, e.g., revolute joint, prismatic joint. The mechanics of operation of apparatus 1300 are described herein for example, at least with respect to FIGS. 16 and 17. The mechanics of operation of a cycloidal gearbox are described herein for example at least with respect to FIG. 15.

Figure 14:
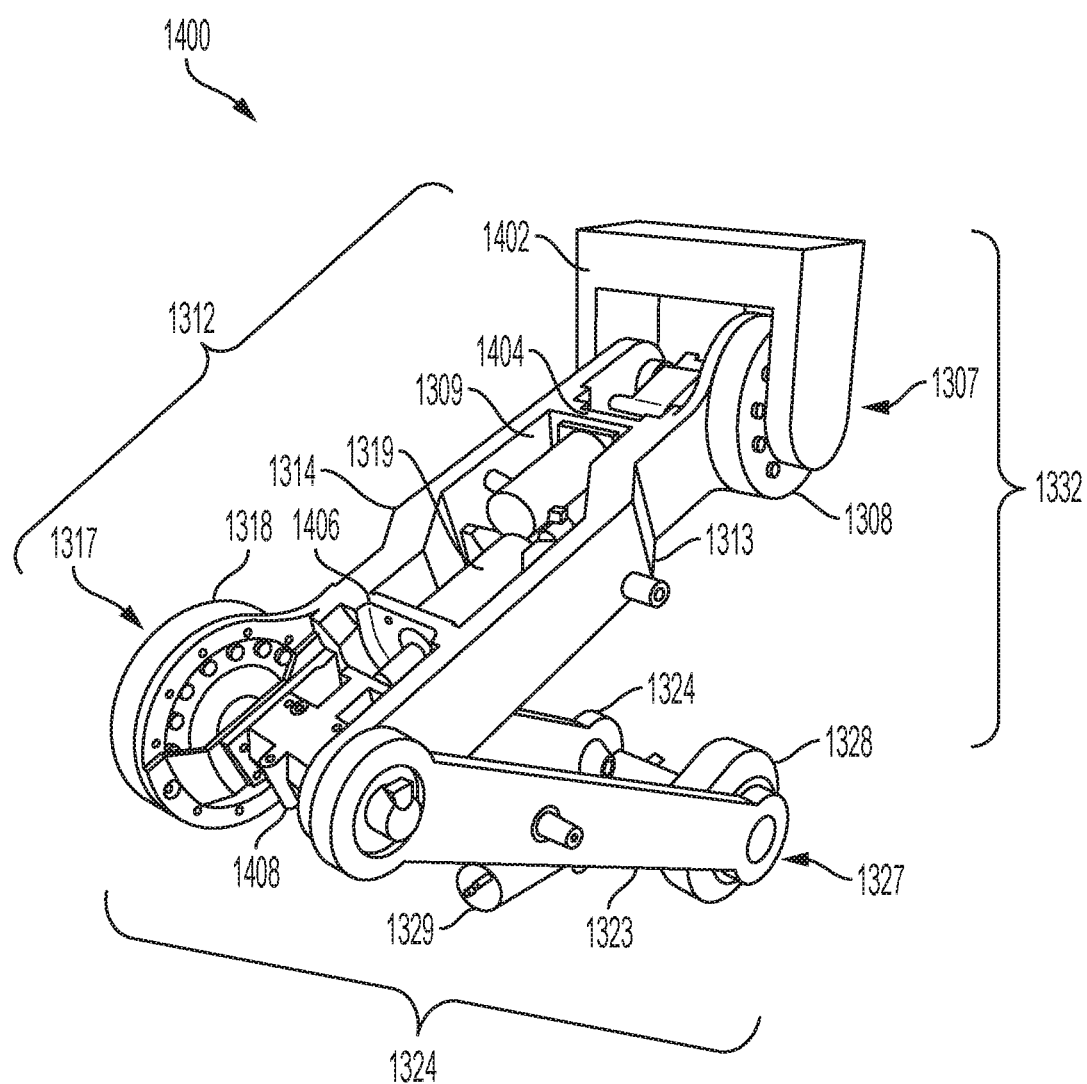
FIG. 14 is a perspective view from a different angle of a modified version of the apparatus shown in FIG. 13.

FIG. 14 illustrates, in perspective view, an exemplary apparatus 1400 for use in robotic systems. Apparatus 1400 shares many components and arrangements as apparatus 1300 and is show in a different view from apparatus 1300.

Apparatus 1400 includes thorax 1402. Thorax 1402 may be a unitary member. Thorax 1402 is coupled to abdomen 1312 via first joint 1307. Abdomen 1312 may include a plurality of rails, e.g., rail 1313 and rail 1314. For example, the rails 1313, 1314 can be paired-up, in counterpart, or a plurality of rails can be spaced apart. Rail 1313 and rail 1314 can be attached to one another in spaced apart relation by one or more struts, such as, strut 1404, and strut 1406. Strut 1404 and strut 1406 can be used as structures to mount motors 1309 and 1319 to abdomen 1312 via fasteners (e.g., bolts, nuts, screws, clamps) or other couplers. Rail 1313 and rail 1314 can be parallel to one another or extend in cooperatively but in a more general arrangement (as shown). Rail 1303 can be the same part as rail 1314 but in a different arrangement. In various implementations, each of rail 1313 and rail 1314 includes a pair of dog leg bends in shape where each dog leg bend on a rail reverses the other.

Apparatus 1400 includes thigh 1324. Second joint 1317 couples thigh 1322 and abdomen 1312. Thigh 1324 may include a plurality of rails, e.g., rail 1323 and rail 1324. Rail 1323 and rail 1324 can be spaced apart from one another such that abdomen 1312 may fold into thigh 1322 between rails 1323, 1324. Rail 1323 and rail 1324 can extend in parallel to one another. In some implementations, rail 1323 and rail 1324 include one more struts on the posterior or dorsal side, and/or caudal side, of rail 1323 and rail 1324. Struts on the posterior side, and/or caudal side allow abdomen 1312 to fold further nested into thigh 1322.

Apparatus 1400 can include a 90 degree gearbox 1408 to realign the axial motion of motor 1319. Other motors can be coupled to a 90 degree gearbox, such as, motor 1329 to drive joint 1327 via gearbox 1328.

Apparatus 1300 and apparatus 1400 may use self-locking or non-backdriveable gearboxes. In most gearboxes, when a drive torque is reduced, or removed from the input shaft, e.g., as a result of loss of power, then gears within the gearbox will rotate either in the same direction by inertia, or in the opposite direction under force of the output load. The output load result from gravitational pull on a mass, spring load, etc. The former is known as inertial motion, and the latter condition is known as backdriving for a backdriveable gearbox. During backdriving, the output shaft essentially functions as an input shaft. To make a gearbox non-backdriveable one may add extra components like a brake, clutch, or racket. However, it is possible to advantageously design and use a non-backdriveable or self-locking gearbox. Examples include self-locking worm gears, gears with asymmetric teeth, double-helical gears, and cycloidal gears.

Figure 15:
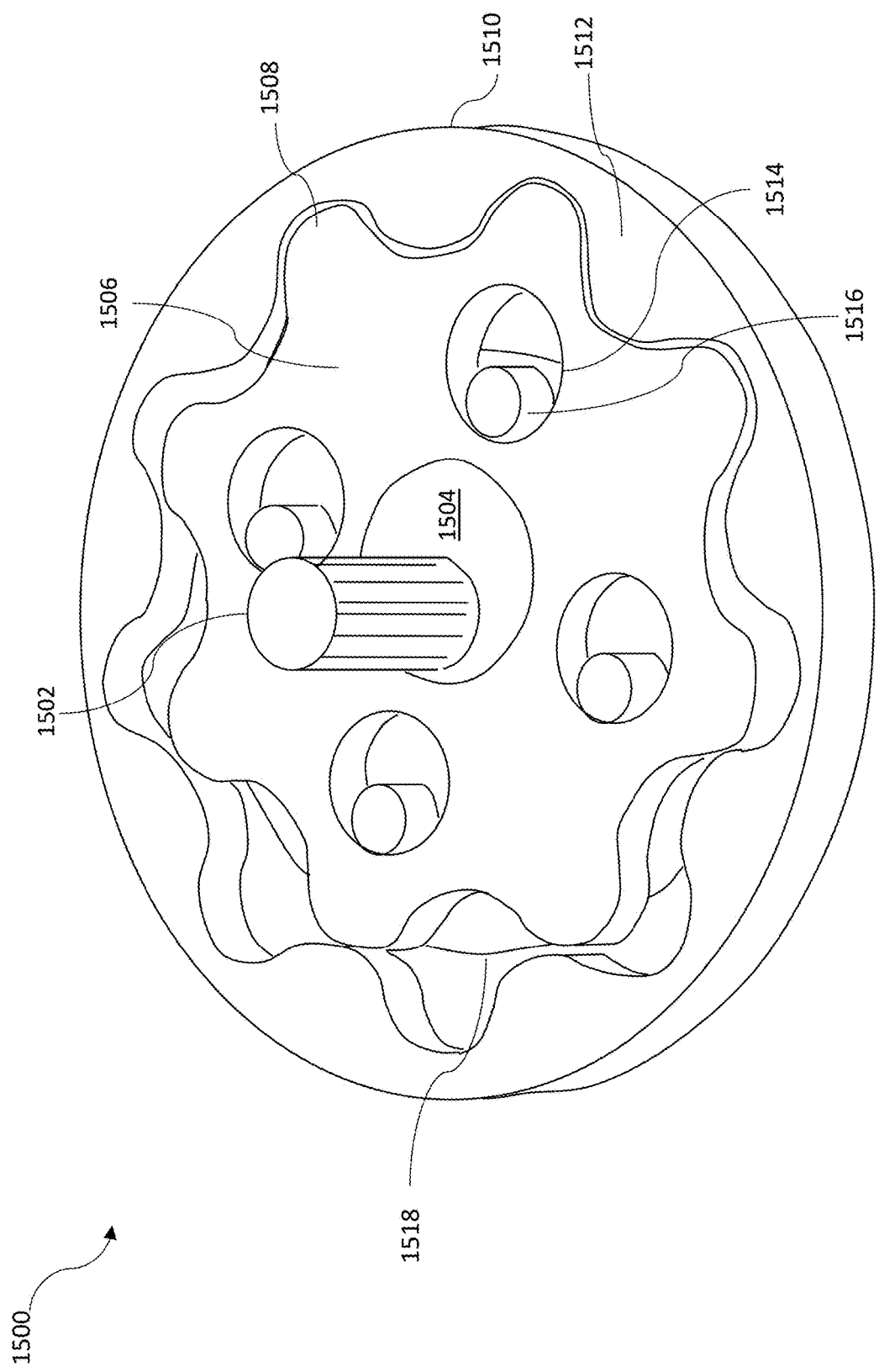
FIG. 15 is a perspective view of a cycloidal gearbox.

FIG. 15 is a perspective view of a cycloidal gearbox 1500. FIG. 15 illustrates aspects of cycloidal gearbox 1500 but, for clarity, omits certain features from the view, such as, one or more bearings, housing, and output shaft.

Cycloidal gearbox 1500 includes an input shaft 1502. Input shaft 1502 may be described as a high-speed shaft. Rotation of input shaft 1502 drives an eccentric sheave or eccentric 1504. That is, a disc mounted eccentrically (i.e., axis located elsewhere than at the geometric center, c.f., concentrically) on a revolving shaft and transforms rotation of the shaft into backward-and-forward motion. Contrast with a cam and cam follower where the backward-and-forward motion is linear motion in the cam follower. In various implementations, eccentric 1504 has a circular profile and may take the form of a circular disc. Eccentric 1504 and input shaft 1502 may be a unitary single piece construction structure. Eccentric 1504 is preferably surrounded by a low friction surface, e.g., may be surrounded by a bearing. For example, a first race (not shown) may be in an interference engagement with eccentric 1504, and a second race (not shown) may be in an engagement with a cycloidal disk 1506, the first and second races positioned in a void between the eccentric 1504 and cycloidal disk 1506, with a plurality of bearings retained between the races.

Rotation of input shaft 1502 and eccentric 1504 drives the cycloidal disk 1506. Cycloidal disk 1506 includes a plurality of teeth or bosses, e.g., tooth 1508 (only one called out), that have a cycloidal shape. More particularly the teeth have an epicycloidal shape with smoothed troughs. A detailed description of the shape of cycloidal disks, and the shape of teeth for the same, can be found in the art. For example, see Biser Borislavov, Ivaylo Borisov, Vilislav Panchev, 2012 "Design of a Planetary-Cyclo-Drive Speed Reducer Cycloid Stage, Geometry, Element Analyses" unpublished, Project Report, Linnaeus University, Växjö, Sweden; and Naren Kumar, 2015 "Investigation of Drive-Train Dynamics of Mechanical Transmissions Incorporating Cycloidal Drives" Doctoral Thesis, Queensland University of Technology, Brisbane, Australia, June 2015.

The rotation of input shaft 1502 rotates cycloidal disk 1506 within a ring gear 1510. Cycloidal disk 1506 is smaller than a void defined in ring gear 1510. The degree of under-sizing of cycloidal disk 1506 (i.e., size of void) is related to the gear ratio of cycloidal gearbox 1500 (to be described) and eccentricity of eccentric 1504.

Ring gear 1510 includes a plurality of teeth, e.g., tooth 1512 (only one called out), and may be formed from a unitary body (as shown) or a plurality of bodies, e.g., a plurality of pins spaced apart to engage cycloidal disk 1506. Ring gear 1510 may be in fixed engagement with a housing (not shown in FIG. 15 see, e.g., gearboxes 1308, 1318, and 1328 in FIGS. 13 and 14) for cycloidal gearbox 1500.

The teeth of cycloidal disk 1506, when driven, rotate within ring gear 1510. That is, a tooth on cycloidal disk 1506 is in phased, gear-gear, or tooth engagement with ring gear 1510. The number of teeth on ring gear 1510 is greater than the number of teeth on cycloidal disk 1506.

Defined with cycloidal disk 1506 are a plurality of voids, e.g., void 1514 (only one called out). Within each void is a pin, such as, pin 1516 (only one called out). The pins are in rolling engagement with the periphery of the voids. A pin can be surround by a sleeve or bearing or include a bearing.

Each pin is connected to an output disk 1518. Generally, an output shaft or slow speed shaft (not shown) is connected to output disk 1518. The pins have a diameter and are arranged on a circle of larger diameter. The total number of pins is equal to the total number of the voids in cycloid disk 1506.

In operation, the cycloidal disk 1506 has some camming action as rotation of input shaft 1502 displaces cycloidal disk 1506 in a plane, as well as imparting of rotation.

In operation, cycloidal gearbox 1500 is a gear train, which begins with rotation of the input shaft 1502 and ends with rotation of an output shaft (not shown; underside of 1500). The speed of rotation of the input shaft 1502 is reduced by the gear ratio of cycloidal gearbox 1500. A gear ratio for cycloidal gearbox 1500 is the ratio of the number of teeth to number of pins. Cycloidal gearboxes offer ratios from as low as 10:1 to over 300:1. A gear ratio is the quotient of the difference of the number of teeth in ring gear 1510 and the number of teeth in cycloidal disk 1506, and the number of teeth in cycloidal disk 1506. Additionally, cycloidal gearboxes advantageously provide high position accuracy.

Figure 16:
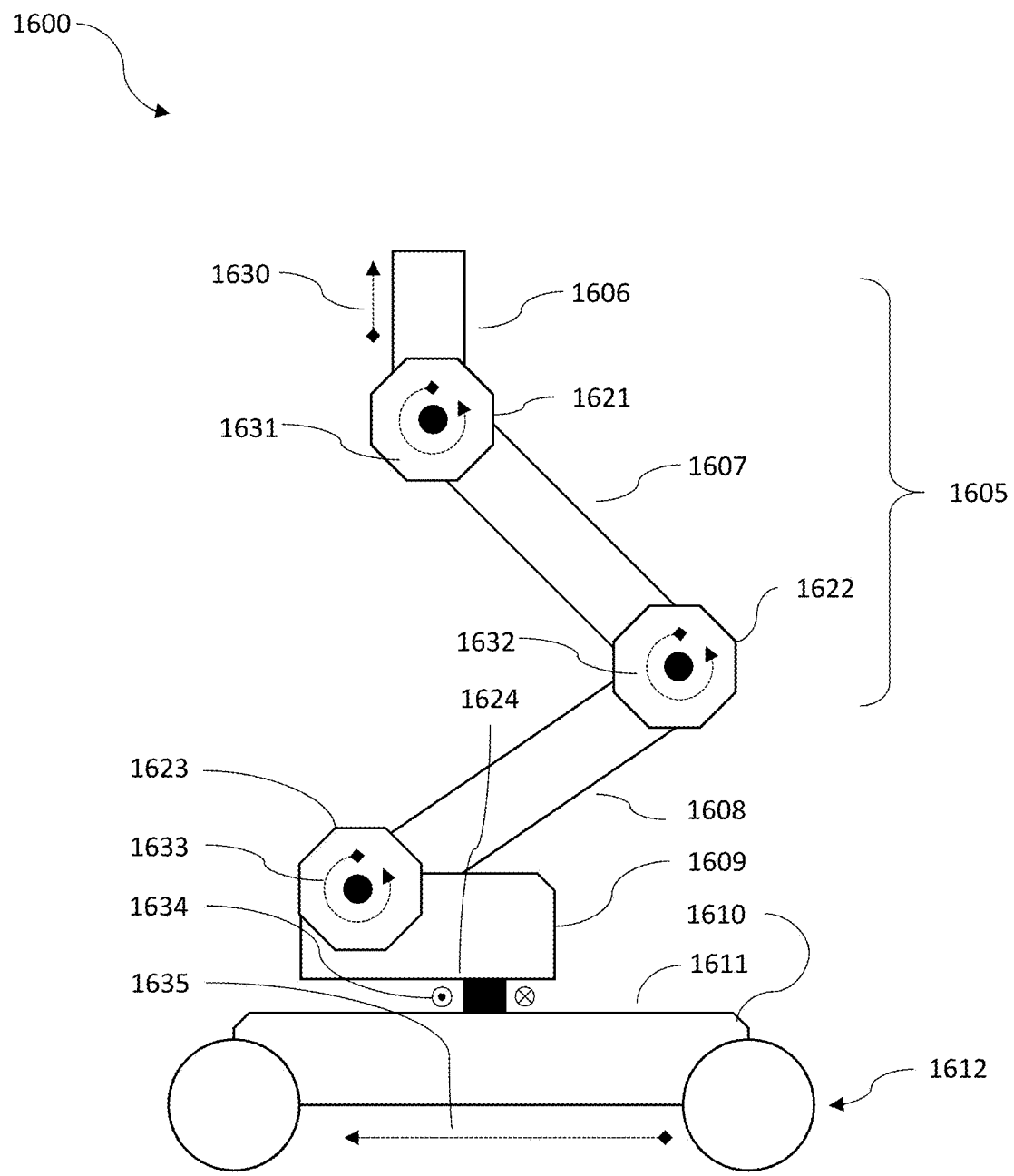
FIG. 16 is a schematic diagram of an apparatus including a yaw degree of freedom and a propulsion system.

FIG. 16 shows an apparatus 1600 including a yaw degree of freedom and a propulsion system, according to at least one implementation. Apparatuses 1300 and 1400 are planar in that the motion is constrained to one plane. Further degrees of freedom can be realized by incorporating apparatus 1300 or apparatus 1400 into larger systems.

Apparatus 1600 includes a torso 1605. Torso 1605 includes a thorax 1606 above an abdomen 1607. Thorax 1606 and abdomen 1607 are coupled by a first joint 1621. Torso 1605 can include a coupler (not shown, for an example see coupler 1340 in FIG. 13). The coupler can couple (e.g., physically or mechanically or magnetically directly or indirectly connect, attach, affix or receive) one or appendages of a robot, e.g., received by thorax 1606.

Disposed below, and coupled to, torso 1605 is thigh 1608. In some implementations, thigh 1608 extends forward and in some implementations thigh 1608 extends backwards (as shown). A second joint 1622 couples abdomen 1607 and thigh 1608. In some implementations, a calf 1609 is disposed below, and coupled to, thigh 1608, via a third joint 1623.

When included in a robot, thigh 1608 is coupled to a base 1610. For example, thigh 1608 is coupled to calf 1609 and calf 1609 is in turn coupled to base 1610. For example, calf 1609 may be coupled to the proximal side 1611 of base 1610. Base 1610 may be stationary. Alternatively, base 1610 can include or be coupled to a propulsion subsystem, e.g., drive train and wheels, such as, wheels 1612.

Apparatus 1600 includes a first joint 1621, a second joint 1622, and a third joint 1623. Each of first joint 1621, second joint 1622, and third joint 1623 includes a revolute degree of freedom about an axis coming into and out of the drawing sheet. Each of first joint 1621, second joint 1622, and third joint 1623 can be a pitch joint. Under cooperative motion of the first joint 1621, second joint 1622, and third joint 1623 the bodies included apparatus 1600 move within the plane of FIG. 16, denominated as a sagittal plane. First joint 1621, second joint 1622, and third joint 1623 may be regarded as pitch joints.

Apparatus 1600 may include a yaw joint 1624 that couples base 1610 and calf 1609. A yaw is twist or rotation of a body about a vertical axis. Yaw joint 1624, when driven, cases the parts of apparatus 1600 above joint 1624 to yaw, i.e., rotate about an axis aligned with the sagittal plane and normal to the ground plane. See motion represented by arrow 1634 (only head and tail of arrow visible in FIG. 16). This axis may be termed the proximal-distal, cranial-caudal, vertical, or Z-axis.

First joint 1621, when driven, causes the parts of apparatus 1600 above first joint 1621 to pitch via a motion represented by arrow 1631. A pitch is twist or rotation of a body around a lateral axis (X or Y according to convention), so that the front and back move up and down, or the top moves forward. Second joint 1622, when driven, causes the parts of apparatus 1600 above second joint 1622 to pitch via a motion represented by arrow 1632. Third joint 1623, when driven, causes the parts of apparatus 1600 above third joint 1623 to pitch via a motion represented by arrow 1633. Cooperation of movement of at least two of motion 1631, motion 1632, and motion 1633 can move thorax 1606 in at least an up-down direction, i.e., motion represented by arrow 1630. A propulsion subsystem, when included, can move base 1610 through at least motion represented by arrow 1635, e.g., a forward-backward translation. In motions represented by arrows 1630 through 1635, the arrow head denotes a positive direction convention.

Figure 17:
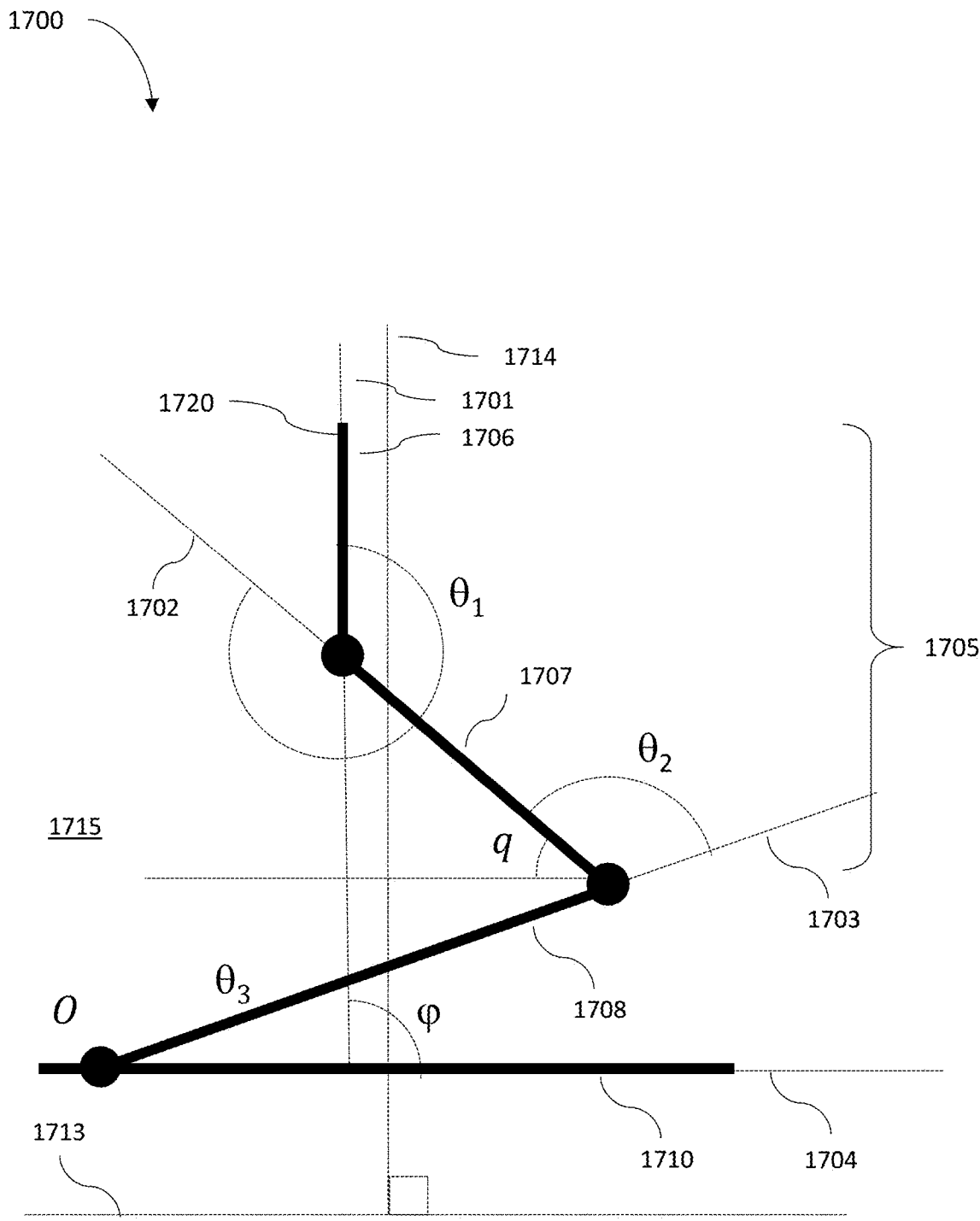
FIG. 17 is a schematic diagram of an apparatus.

FIG. 17 is a schematic diagram of an apparatus 1700 including angles and planes to help describe apparatus 1700 and the relative motion of parts thereof. Apparatuses 1300, 1400, and 1600 are planar in that the motion is constrained to one plane, e.g., sagittal plane or X-Z plane of the device, or plane of the drawing sheet.

Apparatus 1700 includes a base 1710, a first link 1706, a second link 1707, and a third link 1708. First link 1706, second link 1707, and third link 1708 may be regarded as a thorax, abdomen, and thigh, respectively. Second link 1707, and first link 1706 are included in a torso 1705. The base 1710 can include one node (i.e., unary), or more nodes (e.g., binary, trinary). The first link 1706, second link 1707, and third link 1708 are at least binary, that is, including, at least, two nodes each, i.e., distal and proximal. For the first link 1706 the proximal node is superior to the distal node.

Relative to base 1710 one may define a reference axis 1704 running through base 1710, e.g., though both the greatest extent of base 1710. Axis 1704 also runs through the origin or O. Relative to third link 1708 one may define a reference axis 1703 running through both the proximal and distal nodes of third link 1708. Axis 1703 may also run through the origin or O. Between axis 1704 and axis 1703 is a third angle, $\theta_3$. When third link 1708 is aligned with base 1710 the third angle $\theta_3$, zero.

Relative to second link 1707 is a reference axis 1702 running through both the proximal and distal nodes of second link 1707. Between axis 1702 and axis 1703 is a second angle $\theta_2$. When second link 1707 is aligned with third link 1708 the second angle $\theta_2$, zero.

Defined by the distal and proximal nodes of first link 1706 is a reference axis 1701. Between axis 1701 and axis 1702 is a first angle $\theta_1$. Axis 1701 meets axis 1704 (of base 1710) at angle $\varphi$. Where, $\varphi=\theta_1+\theta_2+\theta_3 \mod 2\pi$.

The motion of apparatus 1700 is constrained to a plane. FIG. 17 illustrates three planes. First, below axis 1704, and generally aligned with the same, is ground plane 1713 coplanar with a transverse plane for apparatus 1700. Second, a coronal plane 1714 intersects apparatus 1700 and extends into and out of the drawing sheet of FIG. 17. Third, a sagittal plane 1715 intersects apparatus 1700 and is co-planar with the drawing sheet for FIG. 17.

Apparatus 1700 is a linkage. A linkage includes elements, members, structures, or bodies (in a general sense of term) coupled by mechanical constraints; also known as, a kinematic chain. One generally counts the fixed link or ground. Ubiquitous linkages are a crank and slider, or a 4 bar linkage. Apparatuses 1700, 1400, and 1300 are planar linkages comprising a plurality of links, and one less joint than links, e.g., 4 links and 3 joints, arranged as an open chain, or arc.

A link is a structure that has one, two, three, and sometime more nodes. A node is a point of constraint, e.g., location of a revolute joint. A link can be categorized as unary, binary, trinary, quaternary, etc. based on the total number of nodes. Constraints include revolute joints, sliding engagements and the like, commonly referred to as joints. Each joint has an associated degree of freedom (DOF), such as, translational, or rotational. A revolute joint is DOF one, or f=1. A cylindrical joint has f=2 since it can rotate and translate. A point in a plane has f=2 up-down and left-right. A member with length is f=3.

A movable link in a planar mechanism has 2 translational DOFs and 1 rotational DOF. A revolute joint constrains 2 translational DOFs. A prismatic joint constrains 1 translation DOF and 1 rotational DOF.

The Chebychev-Grübler-Kutzbach criterion determines the number of parameters needed to define a configuration of a linkage, commonly referred to as the mobility or M. The mobility increases with number of links and complexity of each link, and decreases with number of constraints. The mobility of a system formed from n moving links and j joints each with freedom $f_i$, i=1, ... , j, is given by:

$$M = 6n - \sum_{i=1}^{j} (6 - f_i) \tag{3}$$

There is a special case of an open chain, or arc. Here there are a number n of moving links and one fixed link. These links are coupled by a number j=n joints.

$$M = \sum_{i=1}^{j} f_i \tag{4}$$

Apparatus 1700, 1400, and 1300 are planar linkages with 4 links but 3 joints in an open chain or arc. The mobility is 3 since all joints have one rotational degree of freedom. Apparatus 1700, absent a propulsion subsystem, has mobility 4 since it adds a yaw degree of freedom to a planar linkage.

FIG. 17 illustrates information useful to determine the pose of apparatus 1700 and/or of first link 1706. It is convenient to define an angle q between the second link 1707 and the horizontal. The height of the superior node 1720 of first link 1706 can be determined from a sum of the heights provided by each link. If the distances between nodes on third link 1708, second link 1707, and first link 1706 are $l_3$, $l_2$, and $l_1$, respectively, then the height of superior node 1720, y, is proportional to the sum of the following:

$$l_3 \sin \theta_3 + l_2 \sin q + l_1 \sin \varphi \tag{5}$$

The offset, or distance on the horizontal from origin O, e.g., distal node of third link 1708 is proportional to:

$$l_3 \cos \theta_3 - l_2 \cos q + l_1 \cos \varphi \tag{6}$$

One or both of equations for height and offset define a set of trigonometric equations.

In some implementations or in some modes of operation, the first link 1706 will be vertical and thus $\varphi=\pi/2$. Further there are constraints on the pose of apparatus 1700, for example, the first link 1706 (thorax) may be vertical, $=\pi/2$. Additional constraints include:

$$\theta_1+\theta_2+\theta_3-\varphi=0 \tag{7}$$

$$\theta_3+\theta_2+q-\pi=0 \tag{8}$$

$$\theta_1-q-\varphi-\pi=0 \tag{9}$$

These define a linear system of equations. The linear system of equations can be augmented with inequalities on the joint angles.

Apparatus 1700 could be described in terms of angles where a "zero angle" is when one link lies anti-parallel to the previous link. As well, the joints, links, and angle can be renumbered from bottom to top. If so, then the above set of angles can be translated to the new angles via following transformations: $t_1=\theta_3$, $t_2=\pi-\theta_2$, and $t_3=\pi-\theta_1$ and $l'_1=l_3$, $l'_2=l_2$, and $l'_3=l_1$.

Figure 18:
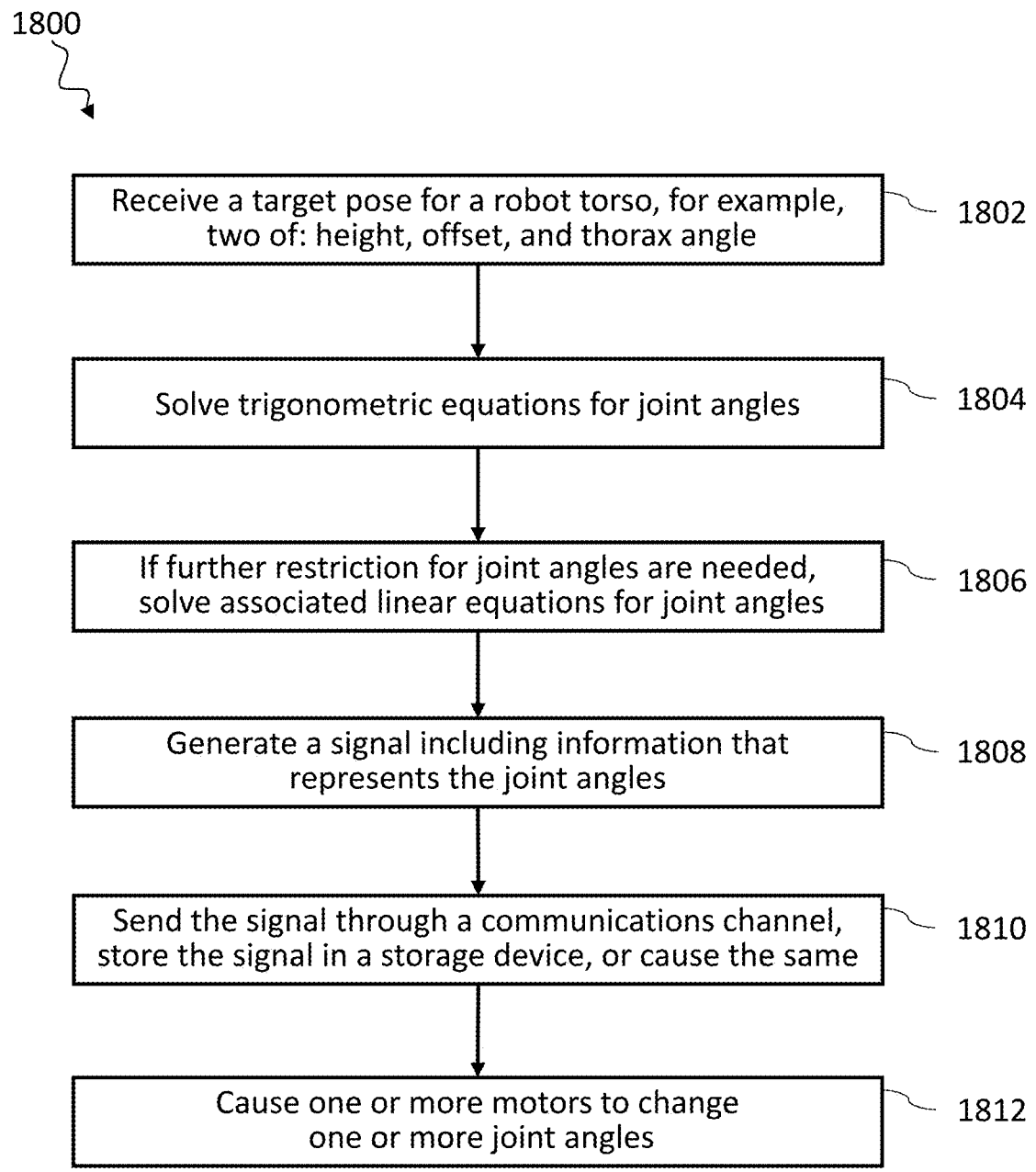
FIG. 18 is a flow-diagram illustrating an implementation of a method of operation for of a system including a robotic apparatus.

FIG. 18 shows method 1800 executable by a controller, such as circuitry, e.g., at least one hardware processor, for operation in a robotic system. Method 1800, in part, describes how a controller may determine a pose of a robot torso, and, optionally cause the robot to assume the same pose. Those of skill in the art will appreciate that other acts may be included, removed, and/or varied or performed in a different order to accommodate alternative implementations. Method 1800 is described as being performed by a controller, for example, a controller subsystem or processor(s) in computer system 106 in conjunction with other components, such as, apparatuses 1300, 1400, 1600, and 1700. However, method 1800 may be performed by multiple controllers or by another system.

For performing part or all of method 1800, the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. The hardware processor(s) may, for example, execute one or more sets of processor-executable instructions and/or data stored on one or more nontransitory processor-readable media. The hardware processor(s) may, for example, execute one or more sets of processor-executable instructions and/or data stored on one or more nontransitory processor-readable media. For performing part or all of method 1800 one or more robots may be included in the operation of a robotic system. Exemplary robots are described herein.

Method 1800 begins, for example, in response to an invocation by the controller. At 1802, the controller receives a pose for a robot torso, e.g., torso 445, torso 1332, torso 1605, torso 1634, or torso 1705). The pose may include a pose for a thorax, e.g., thorax 445, thorax 1302, thorax 1502, thorax 1606, and first link 1706. For example, the controller receives two or more of the following parameters for a pose: height, offset, and thorax angle. Herein, height and offset can be the location of the superior node of the thorax relative to an origin.

At 1804, the controller solves a set of trigonometric equations for joint angles. For example, $\theta_3$, q, and $\varphi$. The solution may be exact or a range of solutions. See above at FIG. 17 for examples of the set of trigonometric equations for joint angles.

At 1806, if needed, the controller solves an associated set of linear equations for the joint angles. For example, the solutions to the set of trigonometric equations did not sufficiently restrict the values for the joint angles. See above at FIG. 17 for examples of the set of linear equations for the joint angles.

At 1808, the controller generates a signal including information that represents the joint angles. At 1810, the controller may send the signal through a communications channel, e.g., communication channel(s) 108, or cause the signal to be send through the communications channel. At 1810, the controller may store the signal, or cause the signal to be stored, in a storage device, e.g., nontransitory tangible computer- and processor-readable storage device(s) 110.

At 1812, the controller causes one or more motors to change joint angles for one or more joints. The controller may controller cause changes in the joint angles based on the signal and the information that represents the joint angles included therein.

Method 1800 ends until invoked again.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or virtually any combination thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure. For example, those skilled in the relevant art can readily create source based on the flowcharts of the figures herein, including FIG. 12 and FIG. 18, and the detailed description provided herein.

As used herein processor-executable instructions and/or data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. In addition, all of the U.S. patents, U.S. patent application publications, U.S. patent applications, foreign patents, foreign patent applications and non-patent publications referred to in this specification and/or listed in the Application Data Sheet, if any, assigned to Kindred Systems Inc., including U.S. patent application Ser. No. 62/393,476, filed Sep. 12, 2016; and U.S. patent application Ser. No. 62/393,474, filed Sep. 12, 2016, are each incorporated herein by reference, in their entirety. Aspects of the embodiments can be modified, if necessary, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for robots, comprising:
    a base;
    a first set of linear actuators, each of the linear actuators of the first set of linear actuators having a respective longitudinal axis, each of the linear actuators of the first set of linear actuators having a respect portion that is selectively operable to translate along the respective longitudinal axis of the respective linear actuator;
    a first set of revolute joints, each of the revolute joints of the first set of revolute joints physically couples a respective one of the linear actuators of the first set of linear actuators to the base;
    a first platform;
    a first set of spherical joints, each of the spherical joints of the first set of spherical joints physically couples a respective one of the linear actuators of the first set of linear actuators to the first platform;
    a second set of linear actuators, each of the linear actuators of the second set of linear actuators having a respective longitudinal axis, each of the linear actuators of the second set of linear actuators having a respect portion that is selectively operable to translate along the respective longitudinal axis of the respective linear actuator; and
    a second set of revolute joints, each of the revolute joints of the second set of revolute joints physically couples a respective one of the linear actuators of the second set of linear actuators to the first platform.

2. The apparatus for robots of claim 1 wherein a respective direct line distance between each pair of spherical joints of the first set of spherical joints is less than a respective direct line distance between each pair of revolute joints of the first set of revolute joints.

3. The apparatus for robots of claim 1, further comprising:
    a second platform; and
    a second set of spherical joints, each of the spherical joints of the second set of spherical joints physically couples a respective one of the linear actuators of the second set of linear actuators to the second platform.

4. The apparatus for robots of claim 3 wherein a second set of spherical joints are angularly arrayed and evenly spaced about a fourth axis.

5. The apparatus for robots of claim 3 wherein a respective direct line distance between each pair of spherical joints of the second set of spherical joints is less than a respective direct line distance between each pair of revolute joints of the second set of revolute joints.

6. The apparatus for robots of claim 5 wherein a respective direct line distance between each pair of spherical joints of the first set of spherical joints is less than a respective direct line distance between each pair of revolute joints of the first set of revolute joints.

7. The apparatus for robots of claim 3, further comprising:
    a first coupler attached to the base, the first coupler sized and dimensioned to physically couple the apparatus to an appendage of a robot.

8. The apparatus for robots of claim 7, further comprising:
    a second coupler attached to the second platform, the second coupler sized and dimensioned to physically couple an end-effector of a robot to the apparatus.

9. The apparatus for robots of claim 3, further comprising:
    a set of one or more links; and
    a set of one or more joints, wherein the set of one or more joints couples the set of one or more links together and to:
        the base,
        the first platform, or
        the second platform.

10. The apparatus for robots of claim 1 wherein each of the revolute joints of the first set of revolute joints has a respective axis about which the respective revolute joint pivots, and the axes of all of the revolute joints of the first set of revolute joints reside in a first plane.

11. The apparatus for robots of claim 1 wherein each of the revolute joints of the second set of revolute joints has a respective axis about which the respective revolute joint pivots, and the axes of all of the revolute joints of the second set of revolute joints reside in a second plane.

12. The apparatus for robots of claim 1 wherein each of the revolute joints of the first set of revolute joints has a respective axis about which the respective revolute joint pivots, and the axes of all of the revolute joints of the first set of revolute joints reside in a first plane and each of the revolute joints of the second set of revolute joints has a respective axis about which the respective revolute joint pivots, and the axes of all of the revolute joints of the second set of revolute joints reside in a second plane.

13. The apparatus for robots of claim 1 wherein each of the linear actuators of the first and the second sets of linear actuators includes a respective cylinder and a respective rod, the respective rod which extends at least partially from the respective cylinder and translates with respect thereto.

14. The apparatus for robots of claim 13 wherein each cylinder in each linear actuator of the first and the second sets of linear actuators includes a respective first portion, and further comprising:
    a first set of valves, each valve in the first set of valves fluidly coupled to a respective one of the cylinders and selectively operable to control a pressure in a first portion of the respective one of the cylinders to cause the respective rod to translate in a first direction.

15. The apparatus for robots of claim 13, further comprising:
    a first set of valves, each valve in the first set of valves fluidly coupled to a respective one of the cylinders and selectively operable to control a pressure in a first portion of the respective cylinder to cause the respective rod to translate in a first direction.

16. The apparatus for robots of claim 15, further comprising:
    a second set of valves, each valve in the second set of valves fluidly coupled to a respective one of the cylinders and selectively operable to control a pressure in a second portion of the respective cylinder to cause the respective rod to translate in a second direction, the second direction opposite the first direction.

17. The apparatus for robots of claim 1 wherein there are three linear actuators in the first set of linear actuators.

18. The apparatus for robots of claim 1 wherein there are three linear actuators in the second set of linear actuators.

19. The apparatus for robots of claim 1 wherein there are three linear actuators in the first set of linear actuators, and there are three linear actuators in the second set of linear actuators.

20. The apparatus for robots of claim 1 wherein there are three linear actuators in the first set of linear actuators, there are three linear actuators in the second set of linear actuators, the first set of linear actuators are angularly arrayed and evenly spaced from one another about a first axis, and the second set of linear actuators are angularly arrayed and evenly spaced from one another about a second axis.

21. The apparatus for robots of claim 1 wherein the first plurality of linear actuators, or the second plurality of linear actuators are pneumatic, the apparatus further comprises:
a pressurized reservoir;
a plurality of conduits that fluidically couple the pressurized reservoir to the linear actuators of the first and the second sets of linear actuators; and
a control system communicatively coupled to control a delivery of a pressurized fluid from the pressurized reservoir to the linear actuators of the first and the second sets of linear actuators.

22. The apparatus for robots of claim 1, further comprising:
a load cell coupled to the second platform, the load cell responsive to an applied force to produce signal representative of the applied force.

23. The apparatus for robots of claim 1 wherein:
the first set of revolute joints are angularly arrayed and evenly spaced from one another about a first axis;
the first set of spherical joints are angularly arrayed and evenly spaced from one another about a second axis; and
the second set of revolute joints are angularly arrayed and evenly spaced from one another about a third axis.

24. An apparatus comprising:
a first link including a proximal side and a distal side, wherein the proximal side of the first link may be coupled to a portion of a robot;
a proximal prismatic platform including:
  a first plurality of linear actuators that extends distally from the first link, wherein each linear actuator in the first plurality of linear actuators includes a distal end and a proximal end,
  a first plurality of revolute joints that couples the first plurality of linear actuators and the first link, wherein each revolute joint in the first plurality of revolute joints couples a proximal end of each linear actuator to the first link,
  a second link, and
  a first plurality of spherical joints, wherein each spherical joint in the first plurality of spherical joints couples a distal end of each linear actuator to the second link; and
a distal prismatic platform including:
  a second plurality of linear actuators that extends distally from the second link, wherein each linear actuator in the second plurality of linear actuators includes a distal end and a proximal end,
  a second plurality of revolute joints, wherein each revolute joint in the second plurality of revolute joints couples the first link to a proximal end of each linear actuator in the second plurality of linear actuators,
  a third link including a distal side, wherein the distal side of the third link may be coupled to the distal side of an end-effector, and
  a second plurality of spherical joints, wherein each spherical joint in the second plurality of spherical joints couples the third link to a distal end of each linear actuator in the second plurality of linear actuators.

25. The apparatus for robots of claim 23, further comprising:
an intermediate prismatic platform including:
  a third plurality of linear actuators that extends distally from the second link, wherein each linear actuator in the third plurality of linear actuators includes a distal end and a proximal end,
  a third plurality of revolute joints that couples the third plurality of linear actuators and the second link, wherein each revolute joint in the third plurality of revolute joints couples the second link to a proximal end of each linear actuator in the third plurality of linear actuators,
  a fourth link coupled to the second plurality of revolute joints, and
  a third plurality of spherical joints, wherein each spherical joint in the third plurality of spherical joints couples the fourth link to a distal end of each linear actuator.

26. The apparatus of claim 24 wherein one or more of the first plurality of linear actuators, or the second plurality of linear actuators, toes inward.

27. The apparatus of claim 24 wherein the first plurality of linear actuators, or the second plurality of linear actuators are pneumatic, the apparatus further comprises:
a pneumatic control system; and
a plurality of pneumatic hoses coupled to the first plurality of linear actuators, or the second plurality of linear actuators.

28. The apparatus of claim 24 wherein:
each joint in the first plurality of revolute joints, the second plurality of revolute joints, the first plurality of spherical joints, or the second plurality of spherical joints, includes a first side and a second side; and
the first side or the second side of the representative joint is formed in a link selected from the first link, the second link, or the third link.

29. The apparatus of claim 24, further comprising:
a joint disposed between and that couples the third link and the second plurality of spherical joints, wherein the joint includes a first side, a second side, and at least one degree of freedom of motion.

30. The apparatus of claim 24, further comprising:
a load cell disposed between and that couples the third link and the second plurality of spherical joints, wherein the load cell in response to an applied force produces a signal, and wherein the applied force is in at least a proximal-distal direction.

31. The apparatus of claim 24 wherein at least one plurality selected from the first plurality of revolute joints, the second plurality of revolute joints, the first plurality of spherical joints, the second plurality of spherical joints, the first plurality of linear actuators, or the second plurality of linear actuators, is of size three.

32. An apparatus, for use in a robotic system, comprising:
a linkage including at least three links, and an equal number of joints to links, wherein the at least three links and equal number of joints are coupled together in an open chain with planar degrees of freedom;
a plurality of motors; and
a plurality of gearboxes, wherein:
  each gearbox in the plurality of gearboxes is self-locking,
  each gearbox in the plurality of gearboxes includes an input shaft and an output shaft,
  a respective motor in the plurality of motors drives a respective input shaft of a respective gearbox of the plurality of gearboxes, and each output shaft of the representative gearbox is coupled to, and drives, a respective joint in the linkage.

33. The apparatus of claim 32 wherein each motor in the plurality of motors further includes a housing, and the housing of each motor is coupled to a respective link in the linkage.

34. The apparatus of claim 33, further comprising:
an element, disposed between and coupling the first link in the linkage and the base; and
a yaw joint including at least one revolute degree of freedom disposed between and coupling the base to the body, wherein the at least one revolute degree of freedom includes an axis aligned with a proximal-distal axis of the linkage.

35. The apparatus of claim 32, further comprising:
a base, including a proximal side; wherein:
the at least three links includes a third link,
the equal number of joints includes a third joint, and
the first joint couples the proximal side of the base to the third link.

36. The apparatus of claim 32 wherein:
the at least three links comprise a first link, a second link, and a third link;
the equal number of joints comprise a first pitch joint, a second pitch joint, and a third pitch joint; and
wherein each joint in the equal number of joints pivotally couples a respective link in the at least three links to pitch in a rotation constrained to a sagittal plane of the linkage.

37. The apparatus of claim 36 wherein:
the linkage is incorporated into a robot;
the first link is a thorax for the robot;
the second link is an abdomen for the robot; and
the third link is a thigh for the robot.

38. The apparatus of claim 36 wherein:
a respective link in the at least three links includes a proximal node and a distal node;
a first joint couples the distal node of the first link and the proximal node of the second link;
a second joint couples the distal node of the second link to the proximal node of the third link; and
a third joint couples to the distal node of the third link.

39. The apparatus of claim 36 wherein the first link in the linkage includes a coupler, and the coupler is sized and shaped to couple to one or more appendages for a robot.

40. The apparatus of claim 32 wherein the plurality of gearboxes are cycloidal gearboxes.

41. The apparatus of claim 32 wherein at least one link in the linkage is, at least, a binary link.

42. The apparatus of claim 32, further comprising:
at least one counterpart link;
at least one strut; and
wherein:
the at least one counterpart link is paired up with at least one link in the linkage, and
the at least one strut connects the at least one counterpart link and at least one link in the linkage.

* * * * *